United States Patent
Vasseur et al.

(10) Patent No.: US 9,774,534 B2
(45) Date of Patent: Sep. 26, 2017

(54) DISTRIBUTED ARBITRATION OF TIME CONTENTION IN TSCH NETWORKS

(71) Applicant: Cisco Technology, Inc., San Jose, CA (US)

(72) Inventors: Jean-Philippe Vasseur, Saint Martin d'Uriage (FR); Patrick Wetterwald, Mouans Sartoux (FR); Pascal Thubert, La Colle sur Loup (FR)

(73) Assignee: Cisco Technology, Inc., San Jose, CA (US)

( * ) Notice: Subject to any disclaimer, the term of this patent is extended or adjusted under 35 U.S.C. 154(b) by 575 days.

(21) Appl. No.: 14/333,755

(22) Filed: Jul. 17, 2014

(65) Prior Publication Data

US 2016/0021006 A1    Jan. 21, 2016

(51) Int. Cl.
| | |
|---|---|
| *H04L 12/26* | (2006.01) |
| *H04L 12/801* | (2013.01) |
| *H04L 12/851* | (2013.01) |
| *H04W 40/24* | (2009.01) |
| *H04W 40/32* | (2009.01) |
| *H04W 40/38* | (2009.01) |
| *H04W 72/04* | (2009.01) |
| *H04L 12/715* | (2013.01) |
| *H04L 12/707* | (2013.01) |

(Continued)

(52) U.S. Cl.
CPC ............. *H04L 47/12* (2013.01); *H04L 45/04* (2013.01); *H04L 45/22* (2013.01); *H04L 45/24* (2013.01); *H04L 47/24* (2013.01); *H04W 40/246* (2013.01); *H04W 40/32* (2013.01); *H04W 40/38* (2013.01); *H04W 72/0446* (2013.01); *H04W 8/005* (2013.01); *H04W 84/18* (2013.01)

(58) Field of Classification Search
CPC ......... H04L 47/12; H04L 45/24; H04L 45/22; H04L 45/04; H04L 47/24; H04W 72/0446; H04W 40/246; H04W 40/32; H04W 40/38; H04W 8/005; H04W 84/18
See application file for complete search history.

(56) References Cited

U.S. PATENT DOCUMENTS

| | | |
|---|---|---|
| 2003/0115340 A1 | 6/2003 | Sagula et al. |
| 2009/0154481 A1 | 6/2009 | Han et al. |
| 2011/0235684 A1 | 9/2011 | Dahlman et al. |

(Continued)

OTHER PUBLICATIONS

International Search Report dated Nov. 10, 2015 in connection with PCT/US2015/039187.

(Continued)

*Primary Examiner* — Afshawn Towfighi
(74) *Attorney, Agent, or Firm* — Parker Ibrahim & Berg LLC; James M. Behmke; Stephen D. LeBarron

(57) ABSTRACT

In one embodiment, a parent node in a network observes time slot usage of a channel hopping schedule by one or more child nodes of the parent node to communicate with the parent node. The parent node also identifies high priority traffic from a particular child node. The parent node detects time contention for the high priority traffic based on an indication that at least a portion of the traffic has been rerouted by a particular child node to a different parent node. In response to detecting the time contention, the parent node adjusts a communication strategy used by the one or more child nodes.

20 Claims, 20 Drawing Sheets

(51) Int. Cl.
  *H04W 84/18* (2009.01)
  *H04W 8/00* (2009.01)

(56) References Cited

U.S. PATENT DOCUMENTS

2012/0155329 A1* 6/2012 Shaffer ................ H04L 45/023
  370/255
2014/0126610 A1 5/2014 Hui et al.
2016/0360546 A1* 12/2016 Kandhalu
  Raghu .............. H04W 72/1242

OTHER PUBLICATIONS

Palattella, Maria Rita et al.: "On Optimal Scheduling in Duty-Cycled Industrial IoT Applications Using IEEE802.15.4e TSCH", IEEE Sensors Journal, IEEE Service Center, New York, NY, US, vol. 13, No. 10, Oct. 1, 2013, pp. 3655-3666.
Dujovne et al. "6TiSCH On-the-Fly Scheduling draft-dujovne-6tisch-on-the-fly-02", Feb. 14, 2014, pp. 1-10.
Thubert et al. "An Architecture for IPv6 over the TSCH mode of IEEE 802.15.4e draft-ietf-6tisch-architecture-03" Jul. 4, 2014, pp. 1-30.
Vilajosana et al. "Minimal 6TiSCH Configuration draft-ietf-6tisch-minimal-02", Jul. 4, 2014, pp. 1-20.
Palattella et al. "Terminology in IPv6 over the TSCH mode of IEEE 802.15.4e draft-ietf-6tisch-terminology-02", Jul. 4, 2014, pp. 1-12.
Watteyne et al. "Using IEEE802.15.4e TSCH in an LLN context: Overview, Problem Statement and Goals draft-ietf-6tisch-tsch-01", Jul. 4, 2014, pp. 1-22.

* cited by examiner

DISTRIBUTED ARBITRATION OF TIME CONTENTION IN TSCH NETWORKS

TECHNICAL FIELD

The present disclosure relates generally to computer networks, and, more particularly, to the distributed arbitration of timeslot contention in time slot channel hopping (TSCH) networks.

BACKGROUND

In general, deterministic networking attempts to precisely control when a data packet arrives at its destination (e.g., within a bounded timeframe). This category of networking may be used for a myriad of applications such as industrial automation, vehicle control systems, and other systems that require the precise delivery of control commands to a controlled device. However, implementing deterministic networking also places additional requirements on a network. For example, packet delivery in a deterministic network may require the network to exhibit fixed latency, zero or near-zero jitter, and high packet delivery ratios.

As an example of a deterministic network, consider a railway system. A railway stem can be seen as deterministic because trains are scheduled to leave a railway station at certain times, to traverse any number stations along a track at very precise times, and to arrive at a destination station at an expected time. From the human perspective, this is also done with virtually no jitter. Which tracks are used by the different trains may also be selected so as to prevent collisions and to avoid one train from blocking the path of another train and delaying the blocked train.

Low power and lossy networks (LLNs), e.g., Internet of Things (IoT) networks, have a myriad of applications, such as sensor networks, Smart Grids, and Smart Cities. Various challenges are presented with LLNs, such as lossy links, low bandwidth, low quality transceivers, battery operation, low memory and/or processing capability, etc. Changing environmental conditions may also affect device communications in an LLN. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like, also present unique challenges to LLNs.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
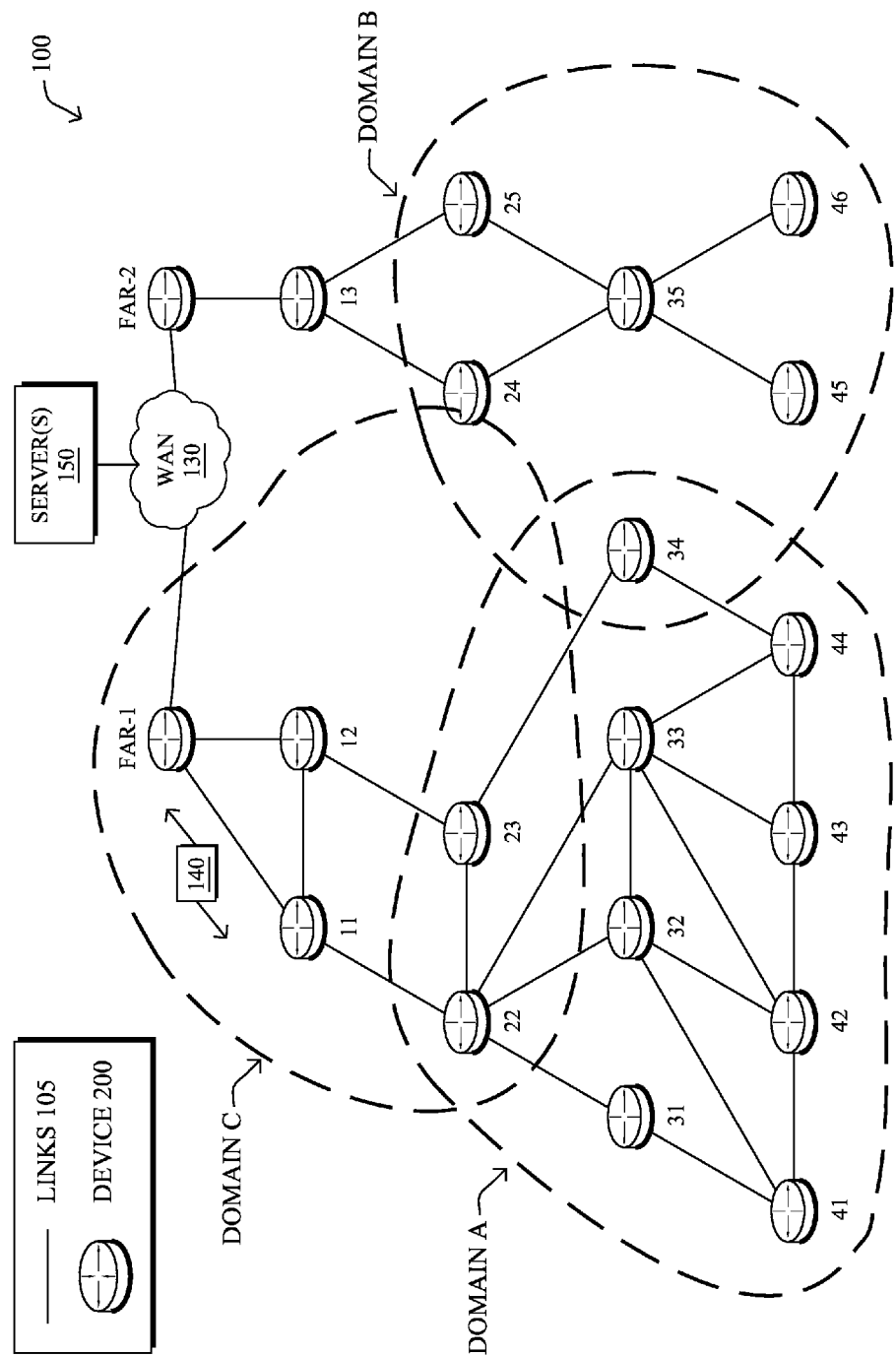
FIG. 1 illustrates an example communication network.

According to one or more embodiments of the disclosure, a parent node in a network observes time slot usage of a channel hopping schedule by one or more child nodes of the parent node to communicate with the parent node. The parent node also identifies high priority traffic from a particular child node. The parent node detects time contention for the high priority traffic based on an indication that at least a portion of the traffic has been rerouted by a particular child node to a different parent node. In response to detecting the time contention, the parent node adjusts a communication strategy used by the one or more child nodes.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 200 (e.g., labeled as shown, "FAR-1," 'FAR-2," and "11," "12," . . . "46," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while network 100 is shown in a certain orientation, particularly with a field area router (FAR) node, the network 100 is merely an example illustration that is not meant to limit the disclosure. Also as shown, a particular FAR (e.g., FAR-1) may communicate via a WAN 130 with any number of servers 150, such as a path computation element (PCE), network management service (NMS), or other supervisory device.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other. One communication technique that may be used to implement links 105 is channel-hopping. Also known as frequency hopping, use of such a technique generally entails wireless devices "hopping" (e.g., alternating) between different transmission and reception frequencies according to a known schedule. Network 100 may also be divided into any number of wireless domains (e.g., domains A-C) in which nodes 200 may communicate.

Figure 2:
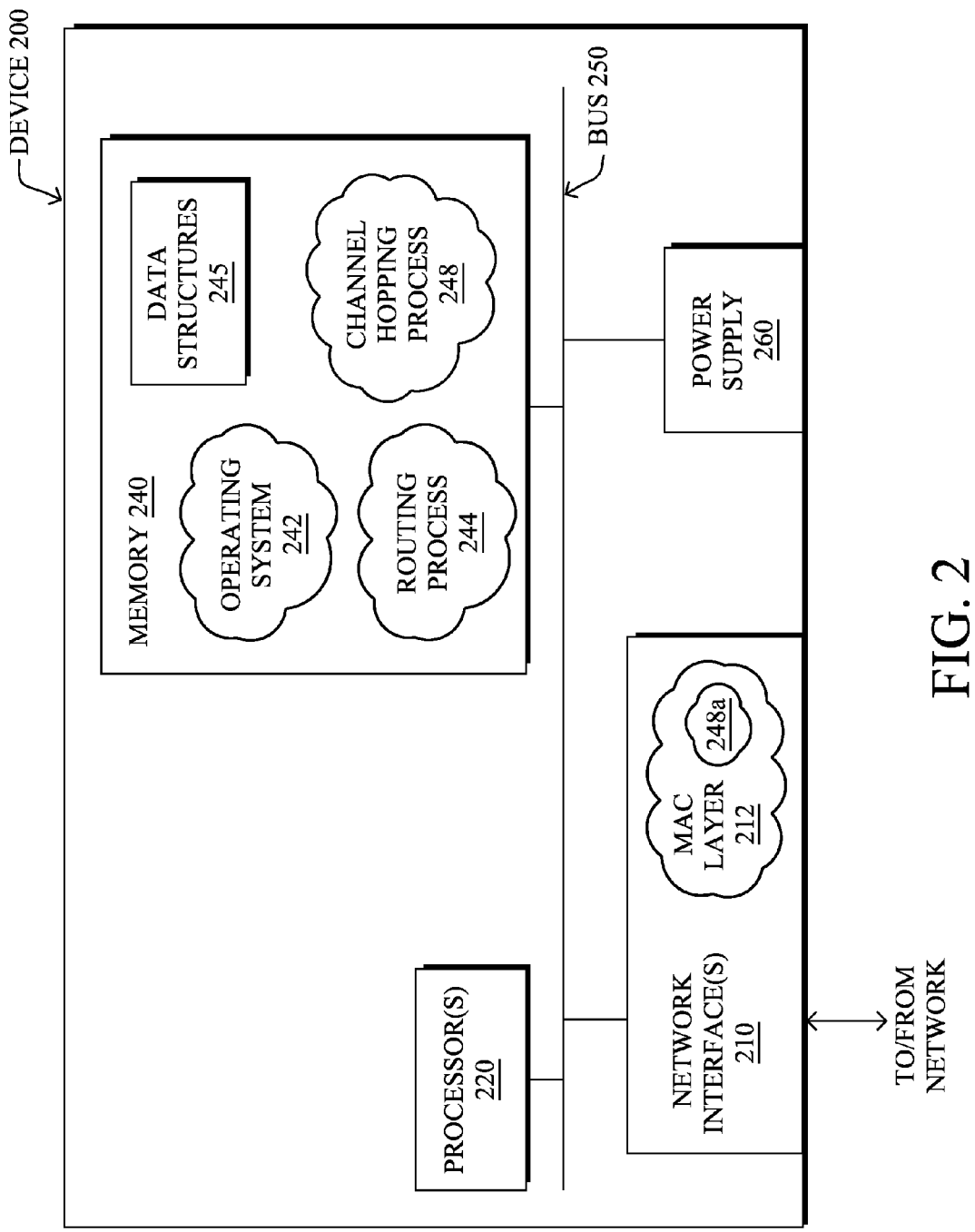
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210, e.g., transceivers, include the mechanical, electrical, and signaling circuitry for communicating data over links 105 coupled to the network 100. The network interfaces may be configured to transmit and/or receive data using a variety of different communication protocols, particularly for frequency-hopping communication as described herein. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 includes a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may include hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may include routing process/services 244, and an illustrative channel hopping process 248 as described in greater detail below. Note that while channel hopping process 248 is shown in centralized memory 240, alternative embodiments provide for the process to be specifically operated within the network interfaces 210, such as within a MAC layer 212 (as "process 248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 includes computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), 6LoWPAN Ad Hoc On-Demand Distance Vector Routing (LOAD), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Rat (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are included in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by routing process 244) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF RFC, entitled "Routing Metrics used for Path Calculation in Low Power and Lossy Networks"<RFC 6551> by Vasseur, et al. (March 2012). Further, an example OF (e.g., a default OF) may be found in an IETF RFC, entitled "RPL Objective Function 0"<RFC 6552> by Thubert (March 2012) and "The Minimum Rank Objective Function with Hysteresis"<RFC 6719> by O. Gnawali et al. (September 2012).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
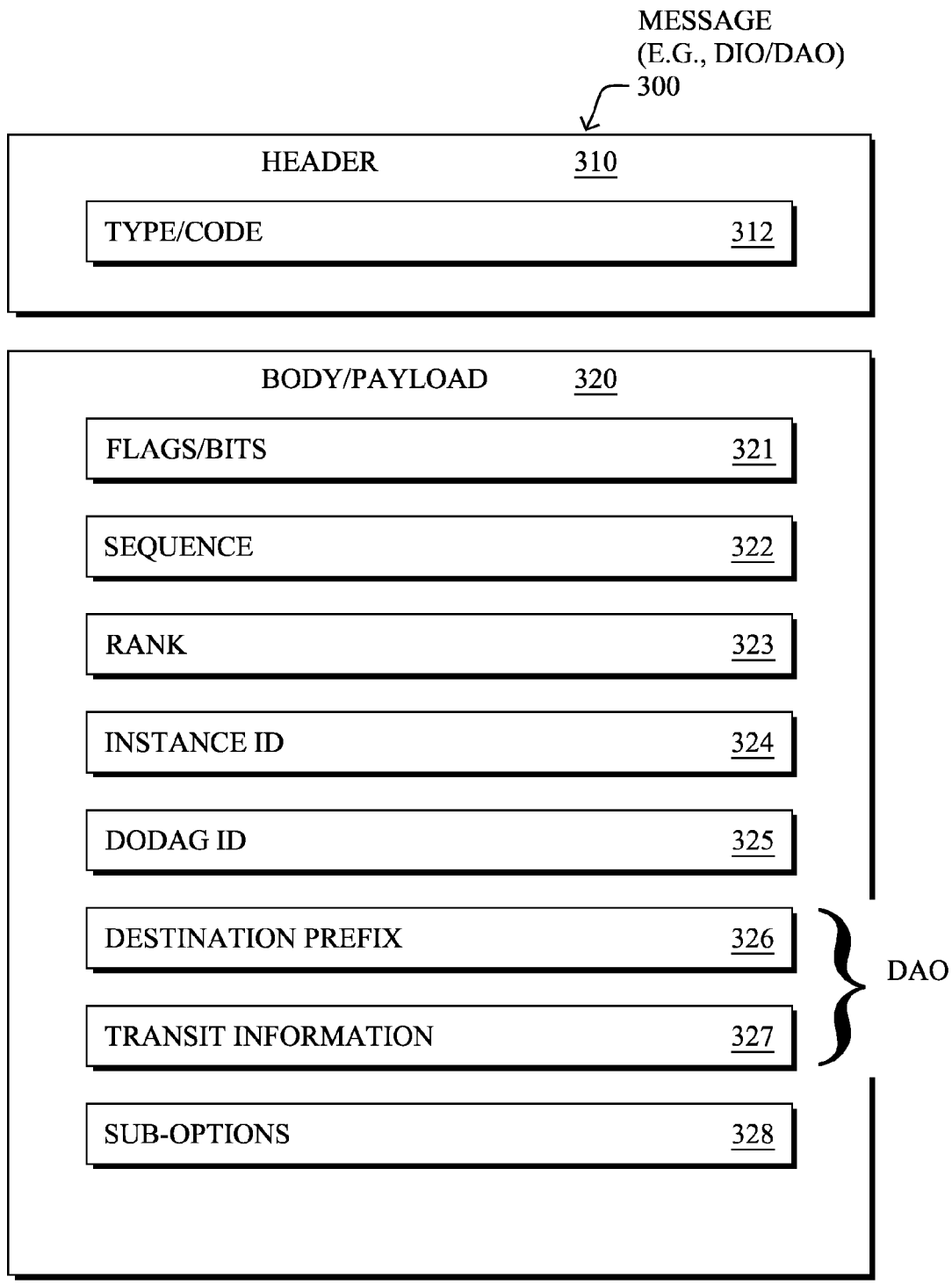
FIG. 3 illustrates an example message.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
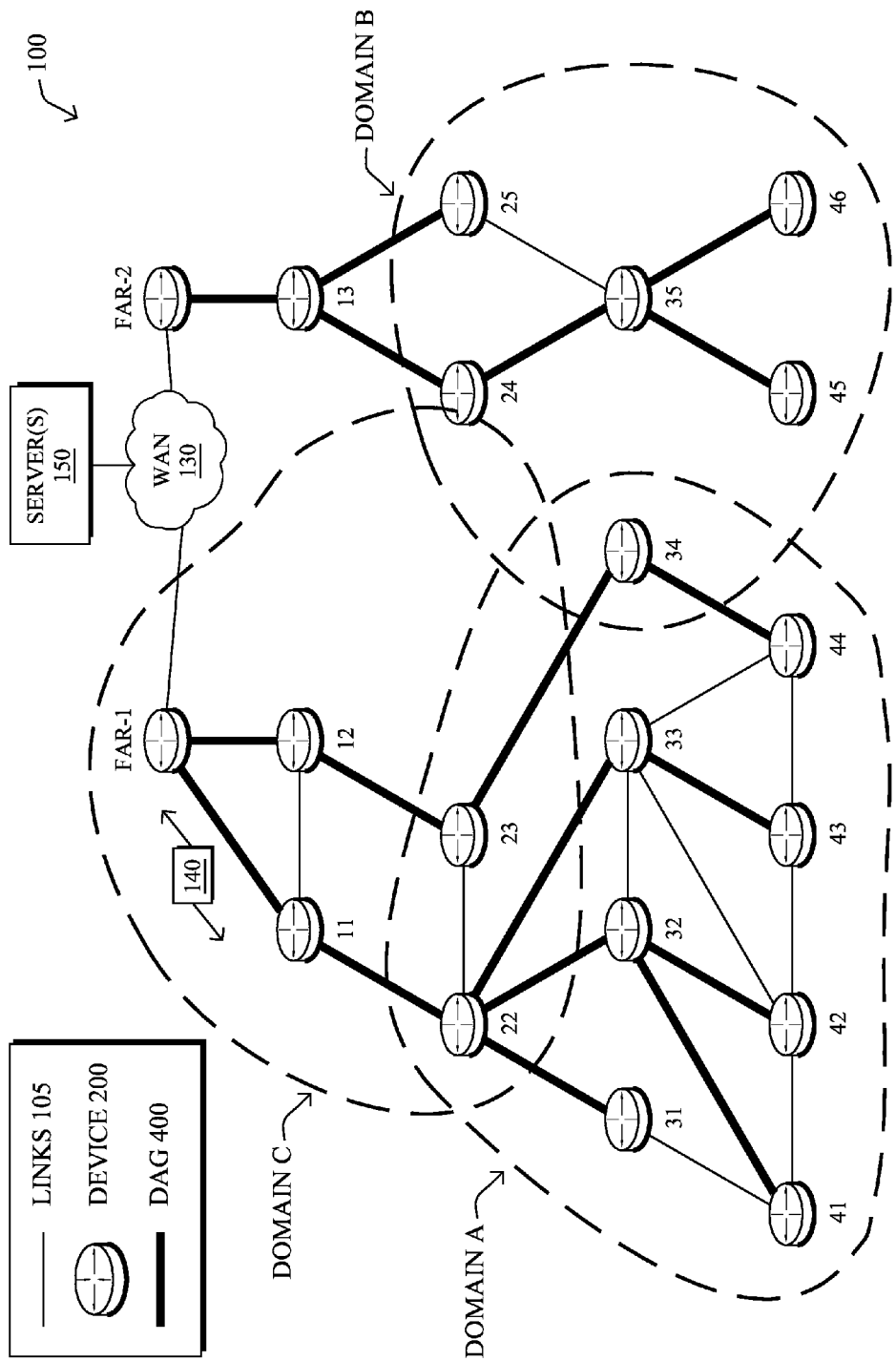
FIG. 4 illustrates an example directed acyclic graph (DAG) in the communication network of FIG. 1.

FIG. 4 illustrates an example simplified DAG 400 that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 410 (shown as bolded lines), which extends from the root node toward one or more leaf nodes (nodes without children). Traffic/packets 140 (shown in FIG. 1) may then traverse the DAG 410 in either the upward direction toward the root or downward toward the leaf nodes, particularly as described herein.

According to various embodiments, communications within network 100 may be deterministic. Notably, low power wireless industrial process control typically uses 1 Hz to 4 Hz control loops, and for those, a scheduled MAC protocol can be considered deterministic, even when clocks drift in the order of tens of parts per million (ppm). A low-throughput technology such as IEEE802.15.4 may thus be adapted to support determinism. In particular, the bandwidth can be pre-formatted in a time division multiplexing (TDM) fashion using IEEE802.15.4, and time slots become a unit of throughput that can allocated to a deterministic flow, without incurring a huge consumption of system resources. In other implementations of a time sensitive network, individual timers may be used by the networked devices instead of TDM. Such timers may elapse at the time of a deterministic transmission, so as to reserve the medium for that transmission, leaving the medium free for best effort routing the rest of the time.

Routing in a deterministic network can be operated either in a centralized or in a distributed fashion, but only the centralized routing operation can guarantee the overall optimization for all the flows with a given set of constraints and goals. An example architecture to support such a technique may be found in the IETF draft entitled "An Architecture for IPv6 over the TSCH mode of IEEE 802.15.4e" by Thubert et al. (February 2014), and referred to herein as "6TiSCH". The centralized computation is typically done by a PCE with an objective function that represents the goals and constraints. A PCE may compute not only an optimized Layer 3 path for purposes of traffic engineering, but also to compute time slots associated with a deterministic flow at the same time as it computes a route over an LLN. Generally speaking, this requires the PCE to have knowledge of the flows as well as knowledge of the radio behavior at each hop (e.g., an estimation of the expected transmission count (ETX) so as to provision enough time slots for retransmissions).

For distributed routing, 6TiSCH relies on the RPL routing protocol (RFC6550). The design of RPL also includes the capability to build routing topologies (e.g., "instances" in RPL parlance) that are associated with objective functions, but in a distributed fashion. With RPL, the routing operations will be more efficient (e.g., with no need of CPU intensive PCE computations) and resilient (e.g., with no dependence on a PCE for base routing and recovery).

Of note is that scheduling is not a part of RPL and may be designed for the distributed routing scheme. Although it is not possible to guarantee that an individual path is fully optimized, or that the distribution of resources is globally optimized, it may be possible to impose deterministic behavior along a routing path (e.g., an ultra-low jitter, controlled latency, etc.).

For the underlying MAC operation, 6TiSCH relies, as its name shows, on time slotted channel hopping (TSCH). More specifically, 6TiSCH is being designed for the IEEE802.15.4e TSCH mode of operation. This is the standardized version of the MAC that was adopted by all industrial WSN standards, ISA100.11a, WirelessHART and WIAPA.

The time slotted aspect of the TSCH technology is a time division multiplexing (TDM) technique, which requires all nodes in the network to be time synchronized. In other words, time is sliced up into time slots with a given time slot being long enough for a MAC frame of maximum size to be sent from mote B to node A, and for node A to reply with an acknowledgment (ACK) frame indicating successful reception.

TSCH is different from traditional low-power MAC protocols because of its scheduled nature. In TSCH, all nodes in the network follow a common communication schedule, which indicates for each active (e.g., transmit or receive) timeslot a channel offset and the address of the neighbor to communicate with. The channel offset is translated into a frequency using a specific translation function which causes pairs of neighbors to "hop" between the different available channels (e.g., frequencies) when communicating. Such channel hopping technique efficiently combats multi-path fading and external interference. Notably, since 6TiSCH is based on TSCH, 6TiSCH also uses the basic TSCH concepts of a schedule and time slots. However, since 6TiSCH may extend over several interference domains with distributed routing and scheduling, there is no longer the concept of a single schedule that would centralize all the transmissions and receptions. In particular, with 6TiSCH, some TSCH concepts may still apply globally and their configurations must be shared by all nodes in the network, but other concepts may be local to a given node in 6TiSCH. For example, the hopping schedule in 6TiSCH may represent only the transmission to which a particular node is participating.

Figure 5:
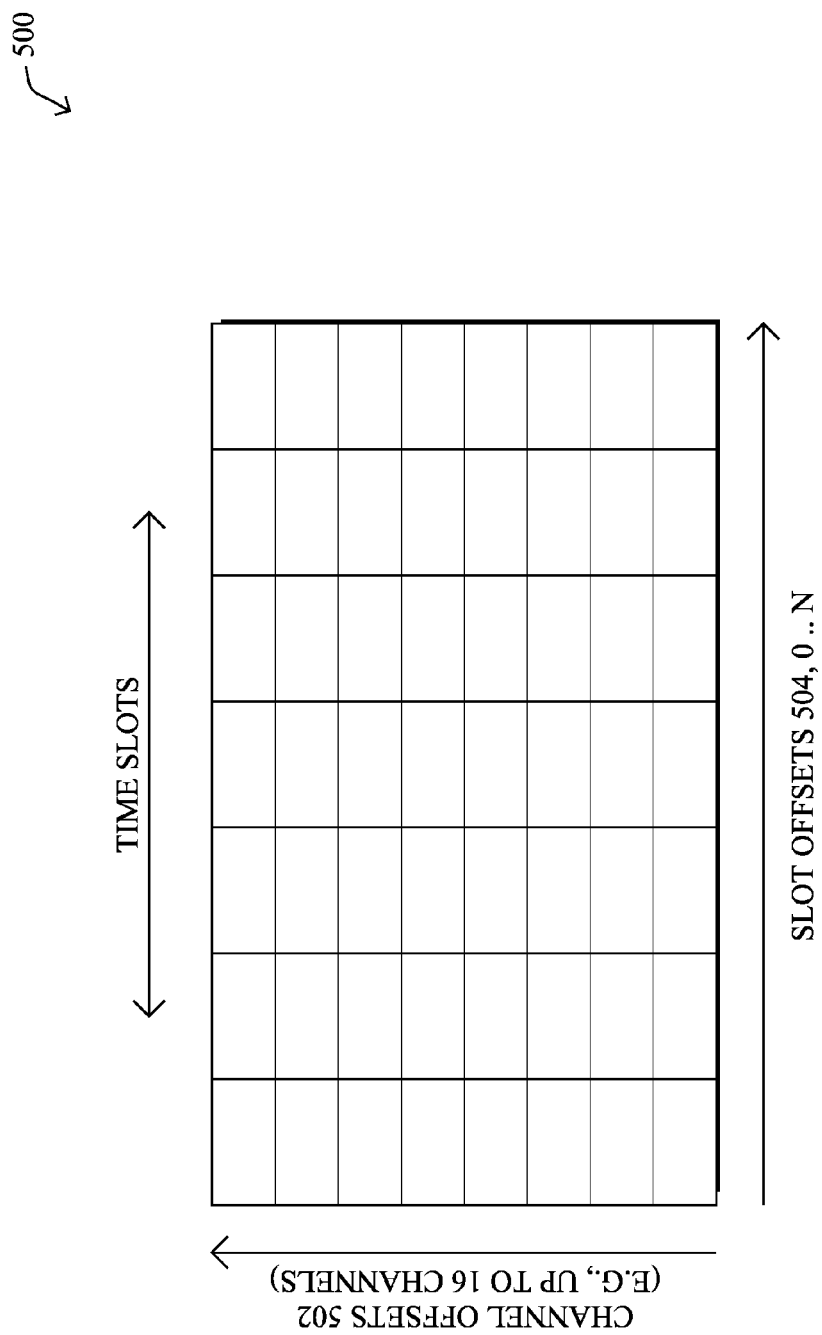
FIG. 5 illustrates an example channel distribution/usage (CDU) matrix.

Referring now to FIG. 5, an example channel distribution/usage (CDU) matrix 500 is shown that may be used by the nodes/devices 200 in network 100. Notably, 6TiSCH defines a new global concept of a CDU matrix that may repeat itself over time and represents the global characteristics of the network such as used/unused channels, timeslot durations, number of time slots per iteration, etc. As shown, CDU matrix 500 may include an index of channel offsets 502 along a first axis that correspond to the channels available for use in network 100 (e.g., offsets for each of sixteen available channels). As would be appreciated, any number of channels may be used in the network. Along the other axis are slot offsets 504 that correspond to differing time slots, the combination of which is equal one period of the network scheduling operation.

CDU matrix 500 may be used to define the basic wireless communication operations for the network. For example, CDU matrix 500 may be used to define the duration of a timeslot (e.g., between 10 to 15 ms), the period of an iteration (e.g., the total number of timeslots, indexed by slot offsets 504), and the number of channels (e.g., indexed by channel offset 502) to which the MAC may jump.

A "cell" in CDU matrix 500 is defined by the pair (slot offset, channel offset) in the epochal description of CDU matrix 500, in other words, at time t=0. During runtime, the actual channel at which a given transmission happens may be rotated to avoid interferences such as self-inflicted multipath fading.

Figure 6:
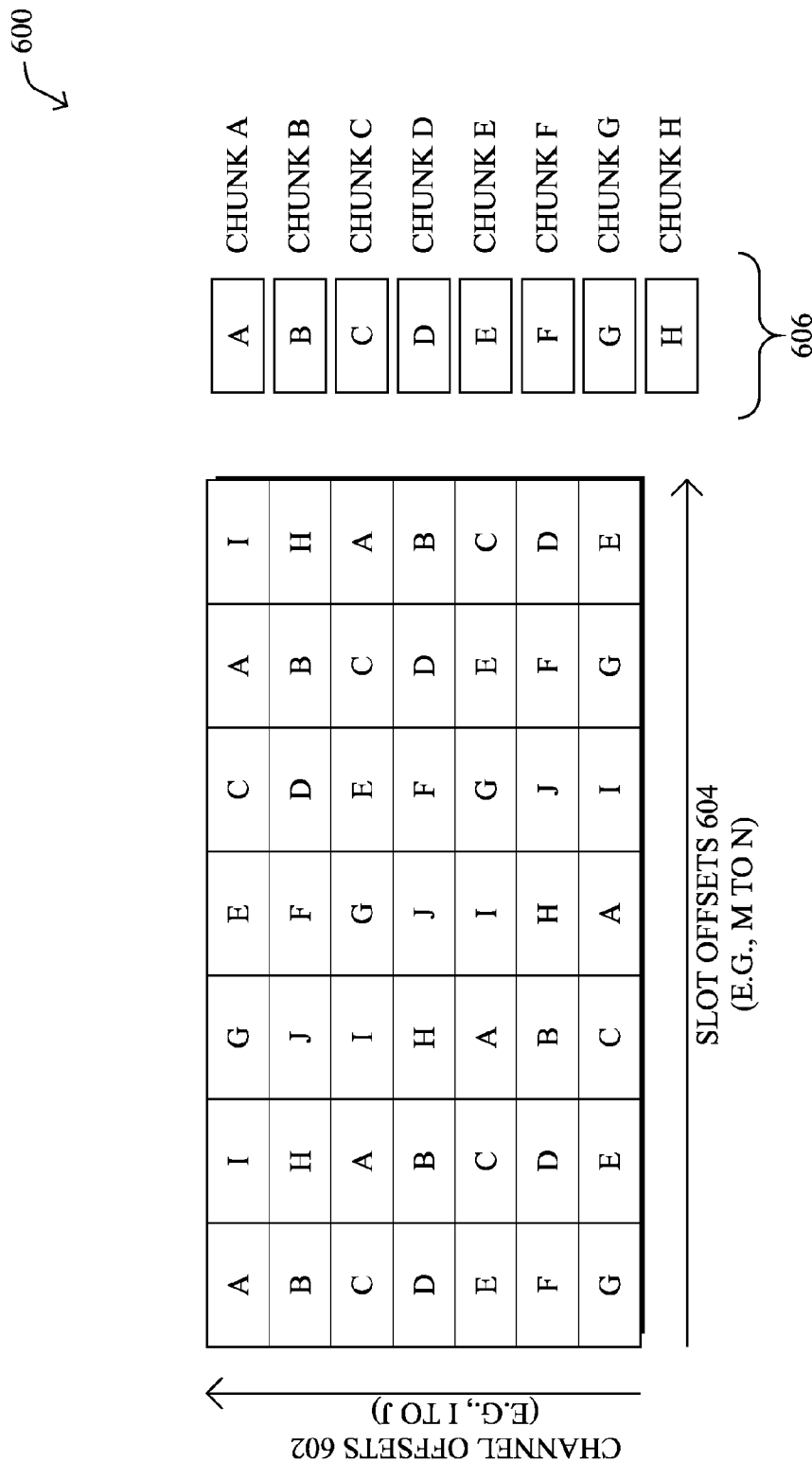
FIG. 6 illustrates example chunks of the CDU matrix of FIG. 5.

Referring now to FIG. 6, an example subset 600 of CDU matrix 500 is shown to be divided into chunks 606. In order to scale the network, the computation of the channel hopping schedule for the network may be distributed. According to some embodiments, such as those in which 6TiSCH is used, a parent node (e.g., an RPL parent) may be responsible for computing the schedule between the parent and its child node(s) in both directions. In order to allocate a cell for a given transmission, the parent node must be certain that this cell will not be used by another parent in the interference domain. As shown, for example, cells within CDU matrix 500 may be "owned" by different parent nodes within the network. The collective cells of CDU matrix 500 assigned to different parent nodes may then be grouped together as chunks 606. In one implementation, for example, CDU matrix 500 may be formatted into chunks by making a full partition of matrix 500. The resulting partition must be well known by all the nodes in the network, to support the appropriation process, which would rely on a negotiation between nodes within an interference domain.

Typically, there will be at most one cell in a chunk per column of CDU matrix 500, to reflect that a device with a single radio may not use two channels at the same time. The cells may also be well distributed in time and frequency, so as to limit the gaps between transmissions and avoid the sequential loss of frames in multipath fading due to the consecutive reuse of a same channel.

Chunks 606 may be defined at the epochal time (e.g., at the time of creation of CDU matrix 500) and the 802.15.4e operation may be repeated iteratively any number of times. Typically, the effective channel for a given transmission may be incremented by a constant that is prime with the number of channels, modulo the number of channels at each iteration. As a result, the channel of a given transmission changes at each iteration and the matrix virtually rotates.

Figure 7:
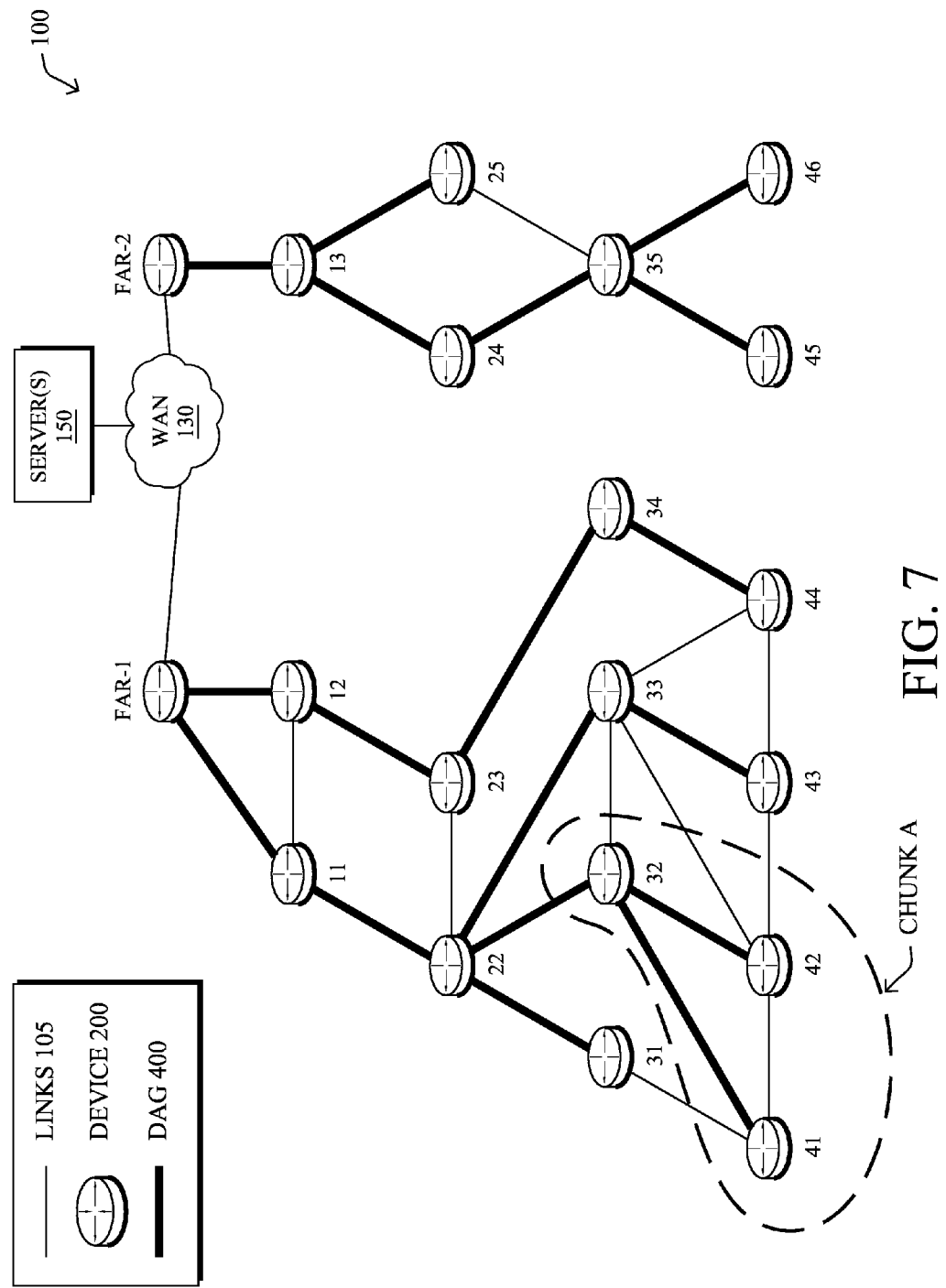
FIGS. 7-8 illustrate examples of a parent node in the network of FIG. 1 scheduling communications for a particular chunk.
Figure 8:
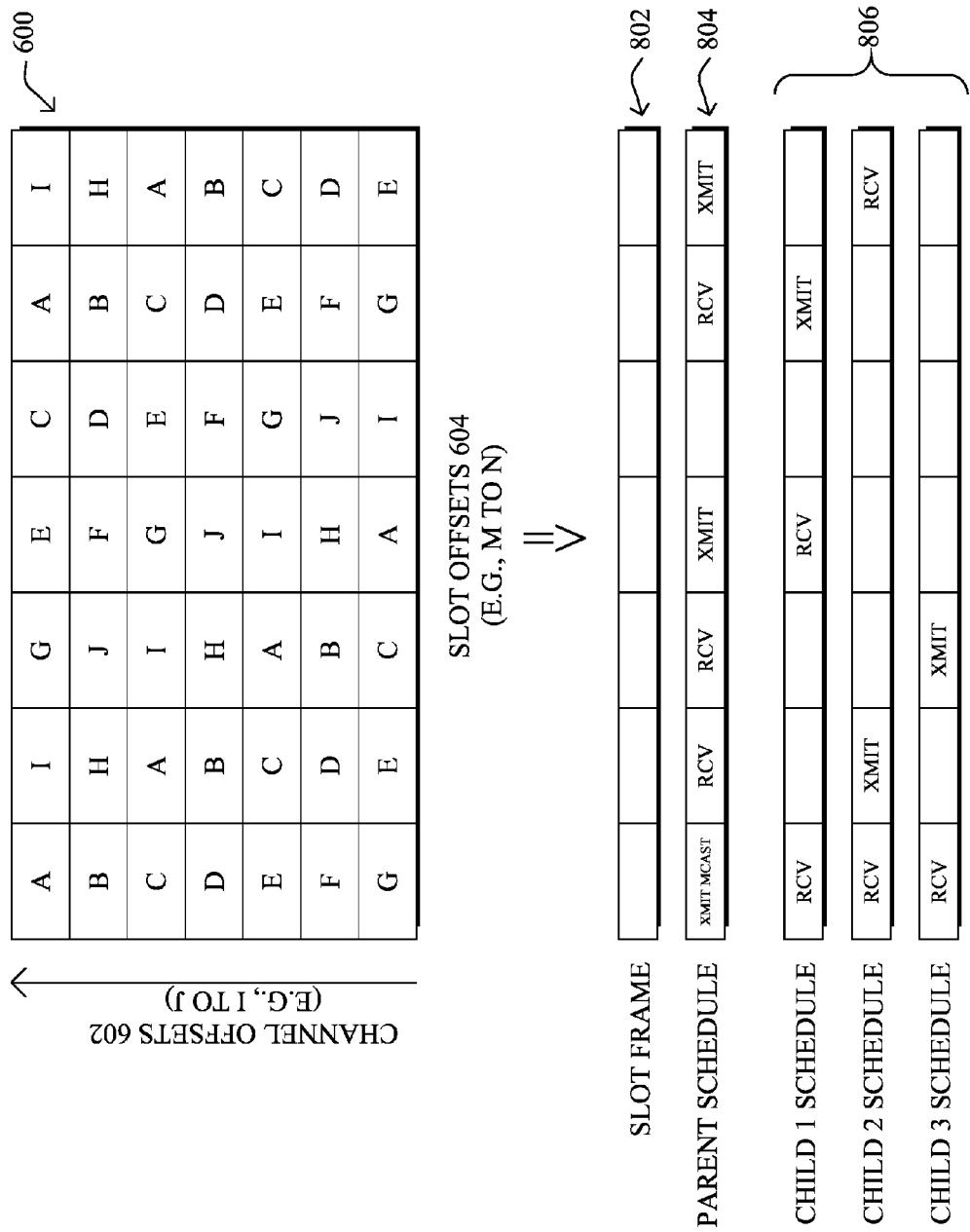

FIGS. 7-8 illustrate examples of a parent node in the network of FIG. 1 scheduling communications for a particular chunk. As shown, assume that node 32 is the parent node of child nodes 41, 42 according to the routing protocol. Node 32 may be assigned a chunk (e.g., chunk A) of CDU matrix 500, thereby allowing node 32 to manage the usage of the corresponding cells in the chunk within its interference domain. Thus, node 32 may decide which transmissions will occur over the cells in the chunk between itself and its child node(s). Ultimately, a chunk represents some amount of bandwidth and can be seen as the generalization in the time/frequency domain of the classical channel that is used to paint a wireless connectivity graph, e.g. to distribute TV frequencies over a country or WiFi channels in an ESS deployment.

If chunks are designed to form a partition of the CDU matrix 500, multiple different chunks may be in use in the same area of network 100 and under the control of different parents. In one embodiment, the appropriation process may be such that any given node that communicates using cells in a given chunk, as appropriated and managed by a parent A, should not be within the interference domain of any other node that is also communicating using the same chunk but appropriated and managed by a different parent B. Consequently, the number of parents in any given area of the network may be constrained by the number of chunks.

Referring more specifically to FIG. 8, parent node 32 may use a slot frame 802 to assign hopping schedules 804, 806 to itself and any of its child node(s), respectively. Generally speaking, slot frame 802 is a MAC-level abstraction that is also internal to the node and includes a series of timeslots of equal length and priority. For example, the size of the slot frame 802 may match the CDU matrix 500. Parent node 32 may use slot frame 802 to divide the corresponding times into slots and associate the slots to a particular operation (e.g., reception, transmission, multicast operation, etc.). For example, as shown, parent node 32 and one of its child nodes may be synchronized to use the same channel during a given time slot.

Slot frame 802 may be characterized by a slotframe_ID, a slot duration, and a slotframe_size. In some implementations, multiple slot frames may coexist in a node's schedule. In other words, a node can have multiple activities scheduled in different slot frames, based on the priority of its packets/traffic flows. The different slot frames may be implemented as having the same durations/sizes or different durations/sizes, in various cases. The time slots in the slot frame may also be indexed by the slot offsets 604 (e.g., the first time slot in slot frame 802 may be indexed as slot offset 0, etc.).

In various implementations, different parent nodes may appropriate different chunks such that the chunks used throughout the network do not interfere. For example, chunks may be appropriated by different parent nodes such that, for a given chunk, the domains do not intersect. In addition, the domains for different chunks are generally not congruent since the chunks are owned by different nodes. As a result, the schedule in a node with a single radio is a series of transmissions, and the parent to child cells are taken from (one of) the chunk(s) that the parent has appropriated.

6TiSCH also defines the peer-wise concept of a "bundle," that is needed for the communication between adjacent nodes. In general, a bundle is a group of equivalent scheduled cells (e.g., cells identified by different slot offset/channel offset pairs), which are scheduled for a same purpose, with the same neighbor, with the same flags, and the same slot frame. The size of the bundle refers to the number of cells it includes. Given the length of the slot frame, the size of the bundle also translates directly into bandwidth, either logical or physical. Ultimately a bundle represent a half-duplex link between nodes, one transmitter and one or more receivers, with a bandwidth that amount to the sum of the timeslots in the bundle. Adding a timeslot in a bundle increases the bandwidth of the link.

As noted above, parent nodes may be responsible for assigning time slots in a channel hopping schedule to the respective child node(s) of the parent. However, and particularly in the context of deterministic LLNs that rely on a PCE for time schedule computation, network scalability may be limited. Indeed, in most cases, an assumption is made that the PCE has a priori knowledge of traffic demands between all nodes in the networks. With the emergence of on-the-fly real time traffic in TSCH network, it is now envisioned to get requests for time slots on-demand. Although not a fundamental issue in high-bandwidth network such as IP/MPLS networks, communication to a PCE becomes a major issue for scaling a TSCH-based LLN. For example, in response to detecting the presence of a super-flow, a node must trigger a request to the PCE, which would in turn re-compute time schedules for a potentially large number of existing flows (which is known as an NP-Complete problem), before sending back the new schedules. In such cases, the control plane and response time will likely be unacceptable in such constrained networks. Also notable is that the control plane may have a direct impact of the network life duration, when battery-operated nodes are present.

According to some embodiments, a PCE may be configured to use a machine learning process to predict network trends, thereby allowing the PCE to oversee the deterministic properties of the network. However, as described above, time allocations between a parent node and its child node(s) may still be managed in a distributed manner by the parent node. Thus, time contention may still exist between different child nodes. For example, assume that a parent node $P_i$ has a set of child nodes $C_1, C_2, \ldots, C_n$. Although the set of time slots may be allocated proactively or predictively by parent node $P_i$, time contention between $C_1, C_2, \ldots, C_n$ may still take place.

Time Contention Arbitration

The techniques herein provide an arbitration process allowing a parent node/device to detect the presence of time contention between a set of child nodes. In some aspects, the parent node may receive information regarding traffic rerouted by a child node along a less preferred/more costly path because of such contention. In further aspects, the parent node may determine whether alternate horizontal paths exist that could be used to alleviate the contention (e.g., by using sibling routing) and perform some arbitration, such as triggering reallocation of time slots between child nodes that experience contention when sending high priority traffic.

Specifically, according to one or more embodiments of the disclosure as described in detail below, a parent node in a network observes time slot usage of a channel hopping schedule by one or more child nodes of the parent node to communicate with the parent node. The parent node also identifies high priority traffic from a particular child node. The parent node detects time contention for the high priority traffic based on an indication that at least a portion of the traffic has been rerouted by a particular child node to a different parent node. In response to detecting the time contention, the parent node adjusts a communication strategy used by the one or more child nodes.

Illustratively, the techniques described herein may be performed by hardware, software, and/or firmware, such as in accordance with the channel hopping process 248/248a, which may include computer executable instructions executed by the processor 220 (or independent processor of interfaces 210) to perform functions relating to the techniques described herein, e.g., in conjunction with routing process 244. For example, the techniques herein may be treated as extensions to conventional protocols, such as the various PLC protocols or wireless communication protocols (e.g., IEEE 802.15.4e 6TiSCH, etc.), and as such, may be processed by similar components understood in the art that execute those protocols, accordingly.

Figure 9A:
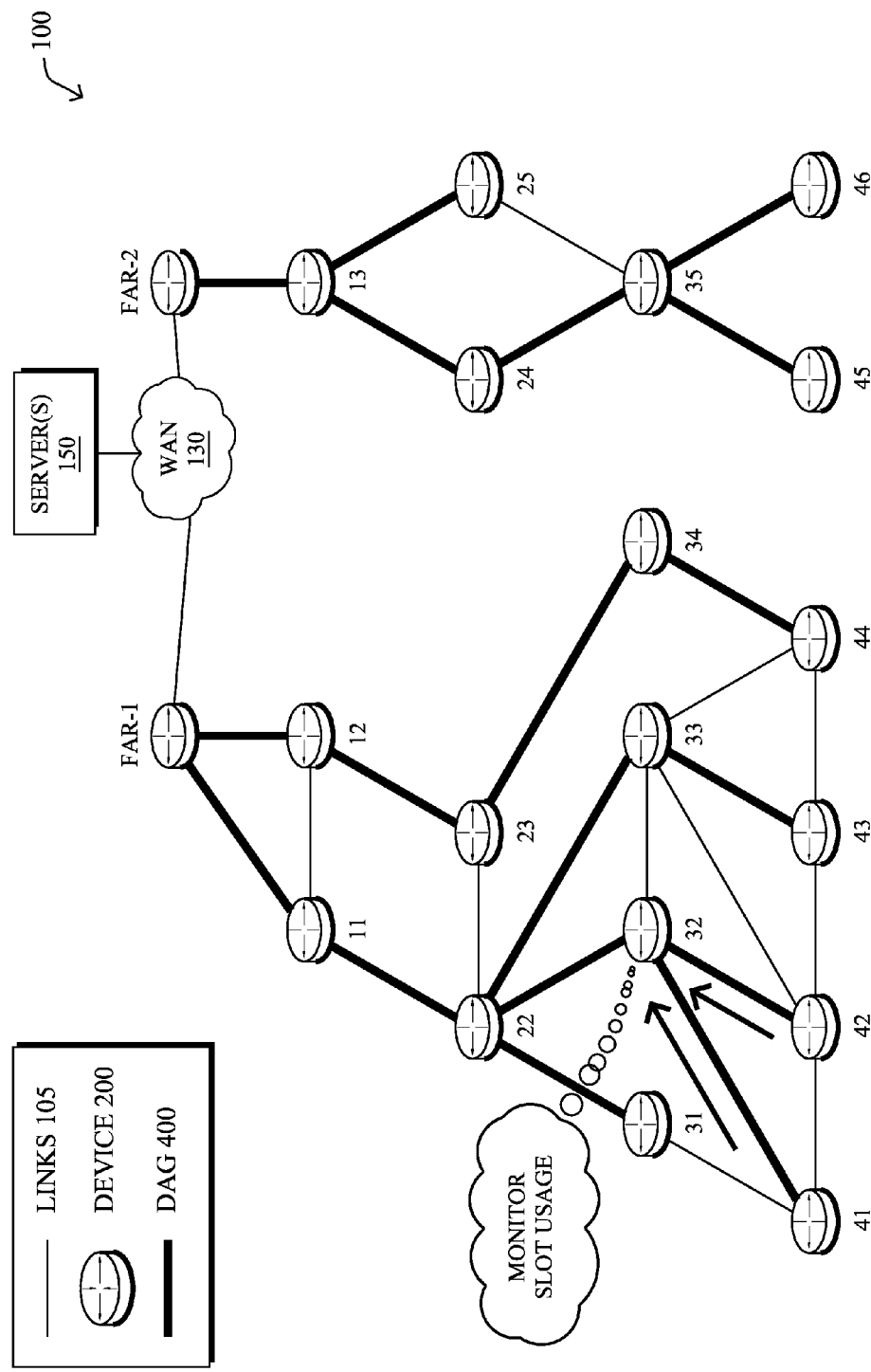
FIGS. 9A-9B illustrate an example of a parent node detecting time contention among child nodes.

Operationally, arbitration may be performed by a parent node in response to detecting time contention between a set of child nodes (e.g., by requesting local packet drops or local reroutes as a resolution to the contention). In a first aspect, time contention between a set of child nodes may be observed by a parent node. According to various embodiments, each parent node may observe the use of allocated time slots by each of its child nodes. For example, as shown in FIG. 9A, parent node 32 may monitor time slot usage by its child nodes 41 and 42. In some cases, a parent node may also monitor the priority of the packets associated with each of child nodes 41 and 42. In other words, parent node 32 may, in some cases, associate the time slot usage by child nodes 41 and 42 with traffic priority information. In one embodiment, parent node 32 may store the time slot usage and/or priority information in a use time table (UTT) within its local memory (e.g., within data structures 245 in memory 240). For example, parent node 32 may perform deep packet inspection of traffic associated with each of child nodes 41 and 42 and store in the UTT a percentage of time slots used for each priority type and child node. According to various implementations, some or all parent nodes within network 100 may perform similar functions.

In cases in which the resources of nodes in network 100 are limited, maintenance of a UTT by a parent node may be considered to be lightweight in comparison to the more CPU-intensive processes of a server 150 (e.g., a PCE). For example, in some embodiments, a parent node may use compression on its UTT, to reduce the amount of information stored in its memory.

Figure 9B:
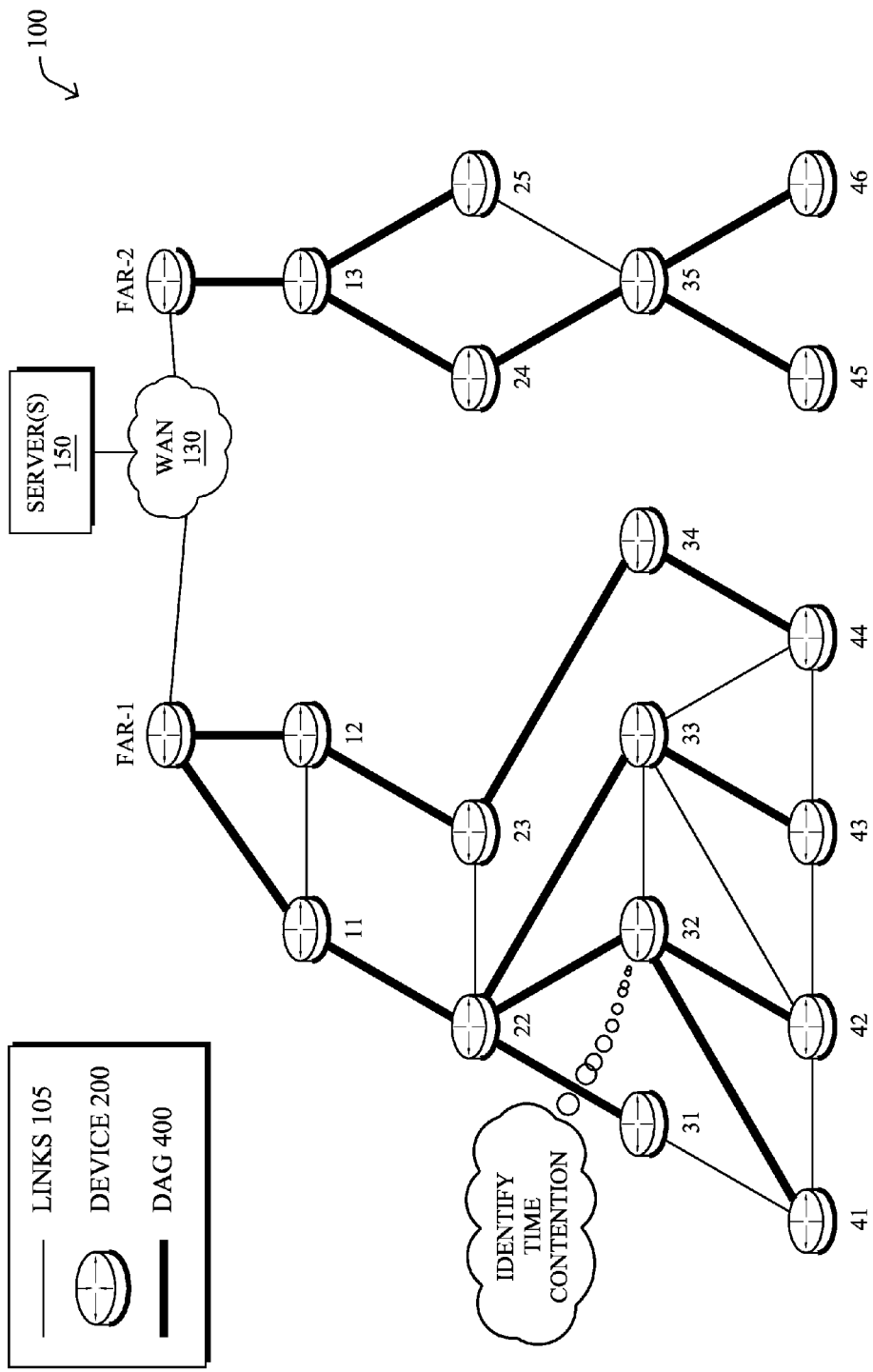

In one embodiment, a parent node may identify time contention among its child nodes based on the observed time slot usage by the child nodes. For example, as shown in FIG. 9B, parent node 32 may analyze its UTT, to determine whether a time contention condition exists between child nodes 41 and 42. As used herein, time contention generally refers to the situation in which the communication needs of a child node are not satisfied by the time slots (e.g., and associated bandwidth) allocated to the node by its parent node. For example, assume that parent node 32 allocates certain time slots to child node 42 for a given time slot frame, but that child node 42 is generating more high priority traffic than can be accommodated by the allocated time slots.

Figure 10A:
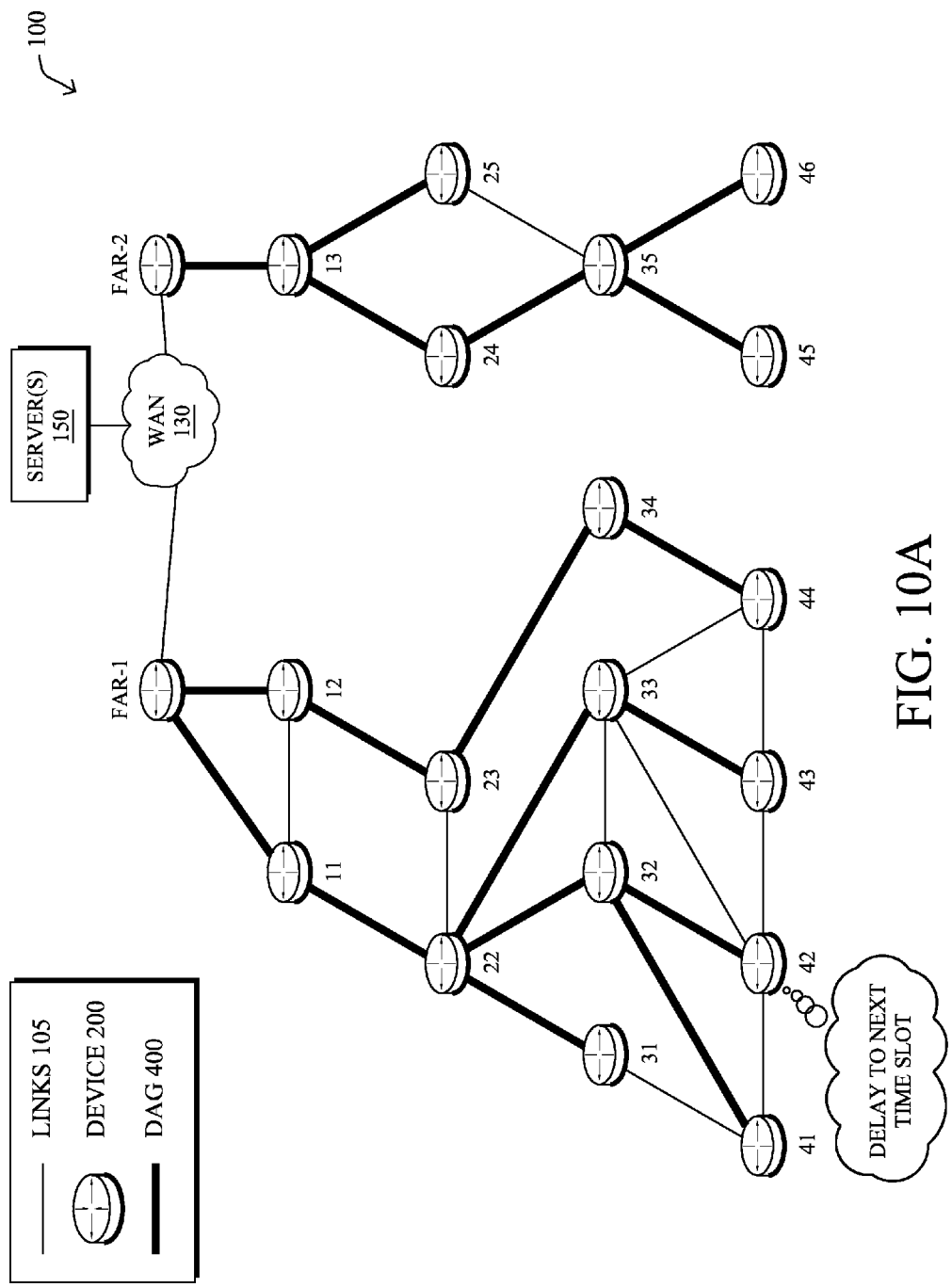
FIGS. 10A-10C illustrate example actions that may be taken by a child node when time contention exists.
Figure 10B:
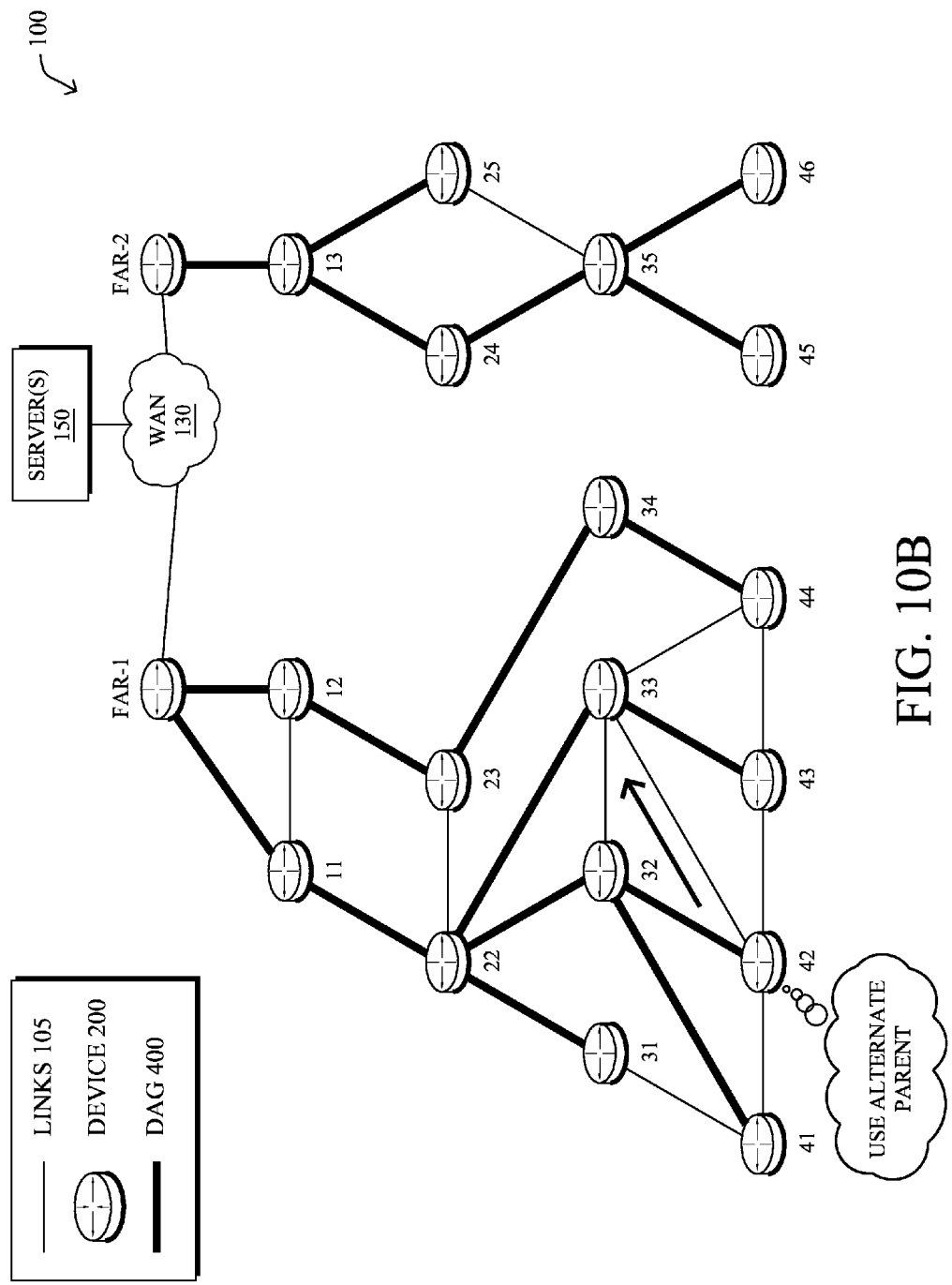
Figure 10C:
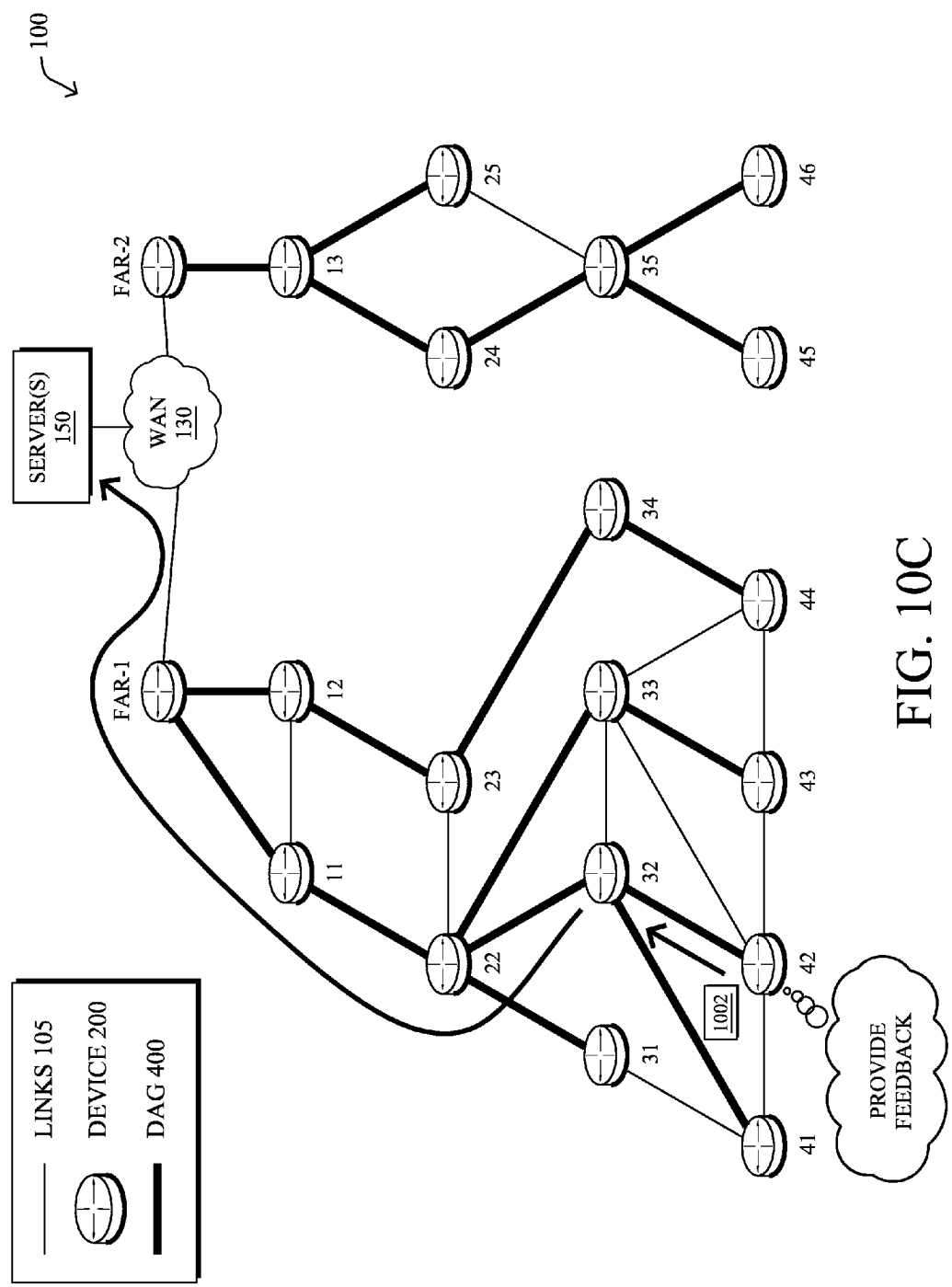

FIGS. 10A-10C illustrate example actions that may be taken by a child node when time contention exists, according to various embodiments. In some cases, a child node that is running out of time slots with its preferred parent due to time contention may queue the traffic until the next available time slot. For example, as shown in FIG. 10A, assume that child node 42 is attempting to send traffic to parent node 32, but does not have sufficient time slots to do so. In such a case, child node 42 may opt to delay the traffic until the next time slot that is allocated to child node 42 becomes available. In doing so, however, this may lead to delays for the traffic, which is particularly problematic in deterministic networks and may be directly attributable to the time schedule itself.

In further cases, a child node may opt to send traffic along an alternate and less preferred path, when time contention exists. Such a path may include an alternate parent identified by the routing protocol in use (e.g., RPL, etc.), but was not included in the primary DAG due to the characteristics of the alternate path (e.g., the alternate path may be longer than the path through the preferred parent, etc.). For example, as shown in FIG. 10B, child node 42 may opt to send traffic to alternate parent node 33, when time contention exists for its preferred parent node 32. However, using an alternate path may also lead to delays in comparison to using the preferred/primary path. Said differently, even though use of an alternate path means that the traffic is rerouted in a quicker fashion in comparison to waiting for the next time slot for the preferred parent, the traffic may still be delayed because the alternate path is likely a longer and more expensive path (e.g., where the associated path cost might be a function of the delay, reliability, etc.) than the primary path.

According to various embodiments, a child node may send feedback to its parent node regarding any corrective actions taken by the child node to alleviate time contention (e.g., by queuing traffic, by using an alternate path, etc.). Notably, certain types of corrective measures may not be identifiable by a parent node by analyzing its UTT alone. For example, a parent node may not be able to detect time contention, if one of its child nodes uses an alternate path. In one embodiment, as shown in FIG. 10C, child node 42 may send feedback notification 1002 to parent node 32, to alert parent node 32 to the use of corrective measures by child node 42 (e.g., by rerouting traffic over an alternate path, etc.). Notification 1002 may indicate, for example, the proportion or percentage of traffic that was rerouted by child node 42 to its less preferred parent (e.g., alternate parent 33). In some cases, notification 1002 may also include information regarding the path cost increase associated with the alternate path. In one embodiment, notification 1002 may be a control plane message such as a DAO message using the RPL routing protocol. For example, the information regarding corrective measures may be piggybacked in a DAO message by compressing the information, so as to be as lightweight as possible. In one embodiment, the feedback received by a parent node (e.g., parent node 32) may also be forwarded to a predictive time scheduler PCE (e.g., in servers 150) that uses machine learning to generate a time schedule based on predicted network states.

Figure 11A:
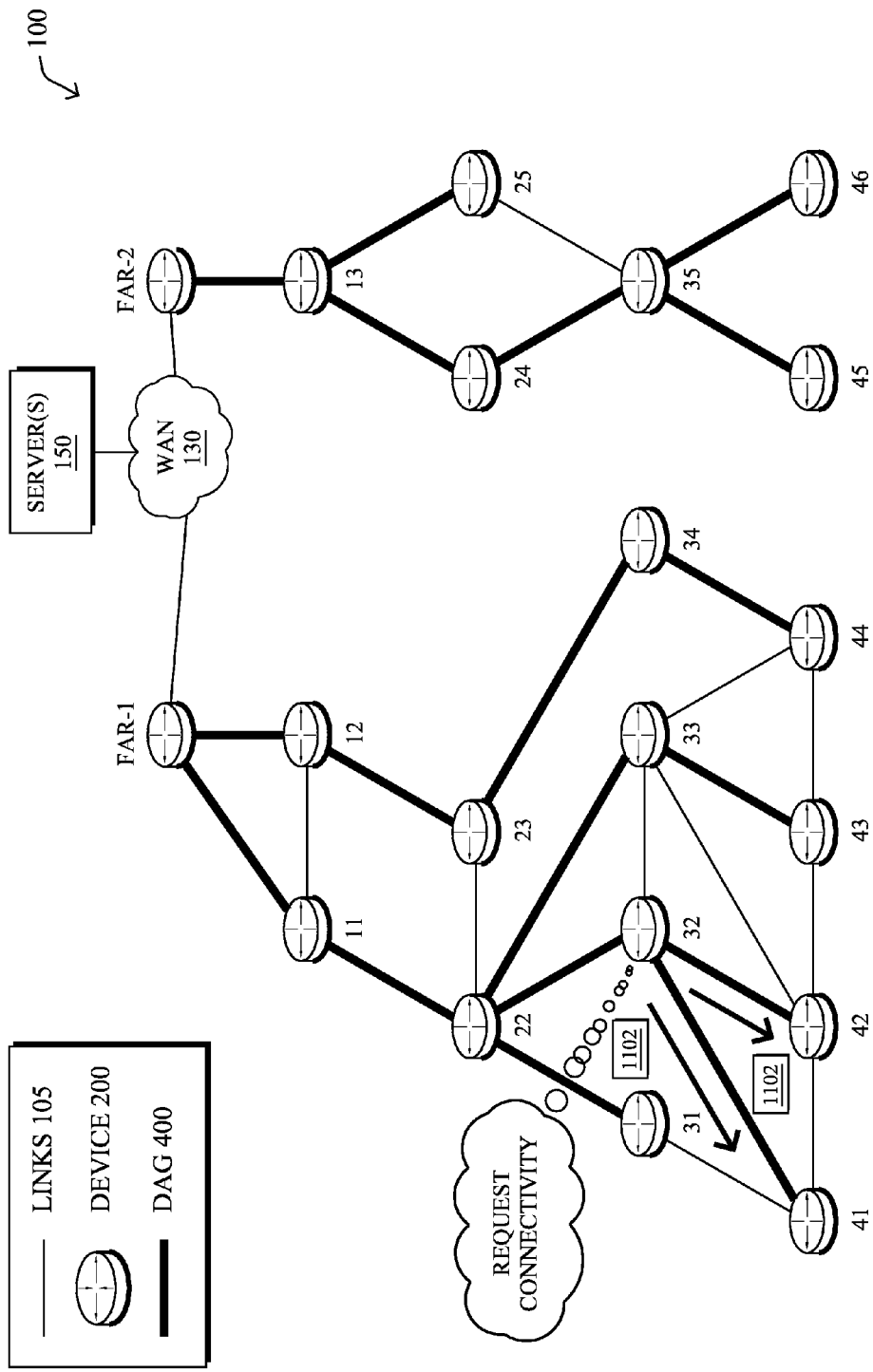
FIGS. 11A-11B illustrate an example of a parent node receiving connectivity information from its child nodes.
Figure 11B:
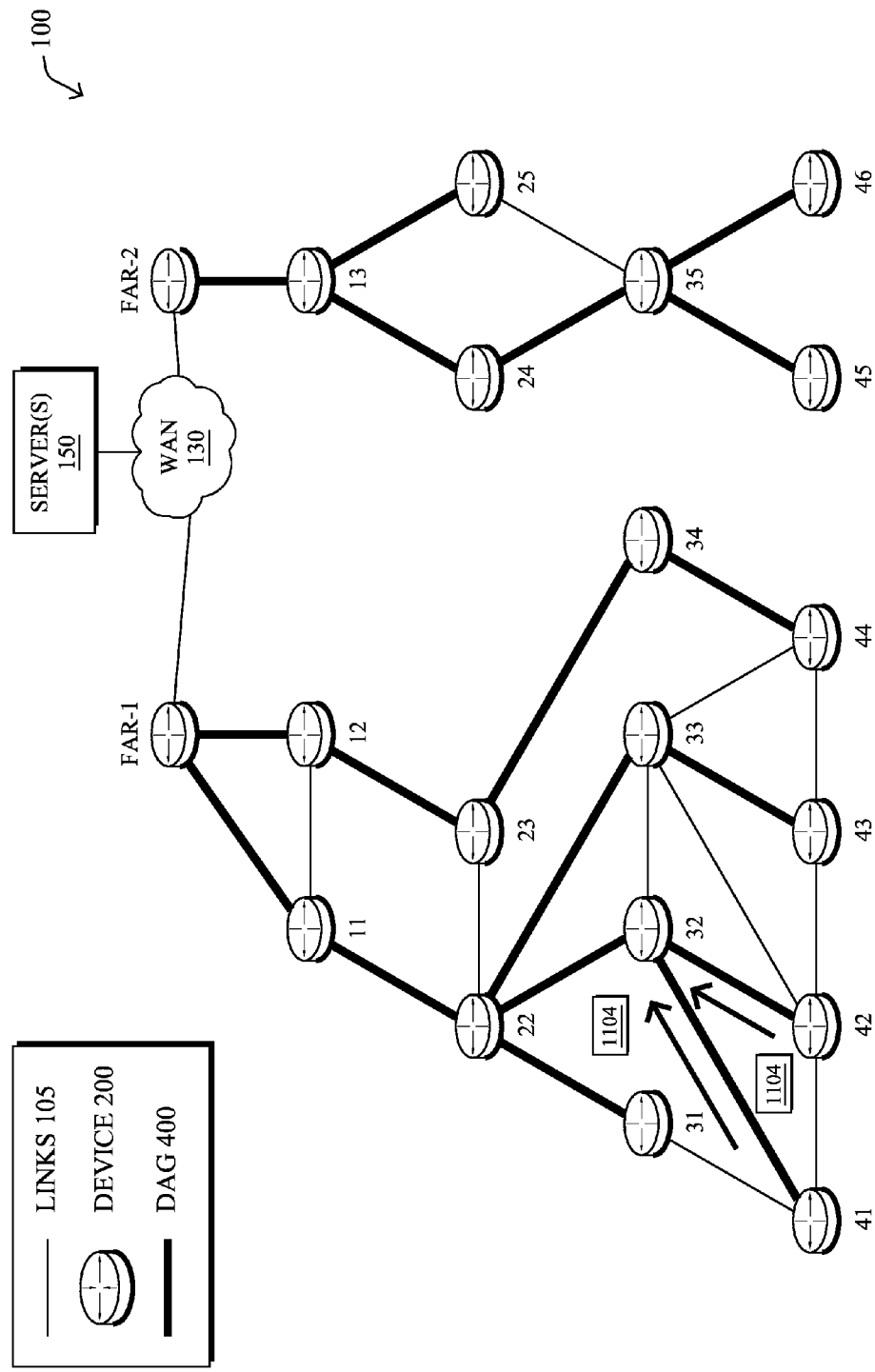

FIGS. 11A-11B illustrate an example of a parent node receiving connectivity information from its child nodes, according to various embodiments. In some embodiments, a parent node $P_i$ may send a request to a child node Ci, to learn its connectivity (e.g., the set of one or more parent nodes that the child node can use as a less preferred parent) and/or the path costs associated with such paths. For example, as shown in FIG. 11A, parent node 32 may send a request 1102 to either or both of its child nodes 41 and 42, to learn their respective connections to alternate parents (e.g., in response to determining that time contention exists). In most cases, this information would not otherwise be available to the parent node. In response, as shown in FIG. 11B, the child nodes 41 and 42 may provide notifications 1104 back to parent node 32 that indicate their potential connections. In some embodiments, the information in notifications 1104 may be compressed, such as through the use of a Bloom filter or other compression technique. Alternatively, in another embodiment, the parent node may determine the list of alternate and less preferred parents of a child node by observing packets sent by its child node and acknowledged by an alternate parent of the same rank. In such a case, sending an explicit request 1102 to a child node may not be needed.

Figure 12A:
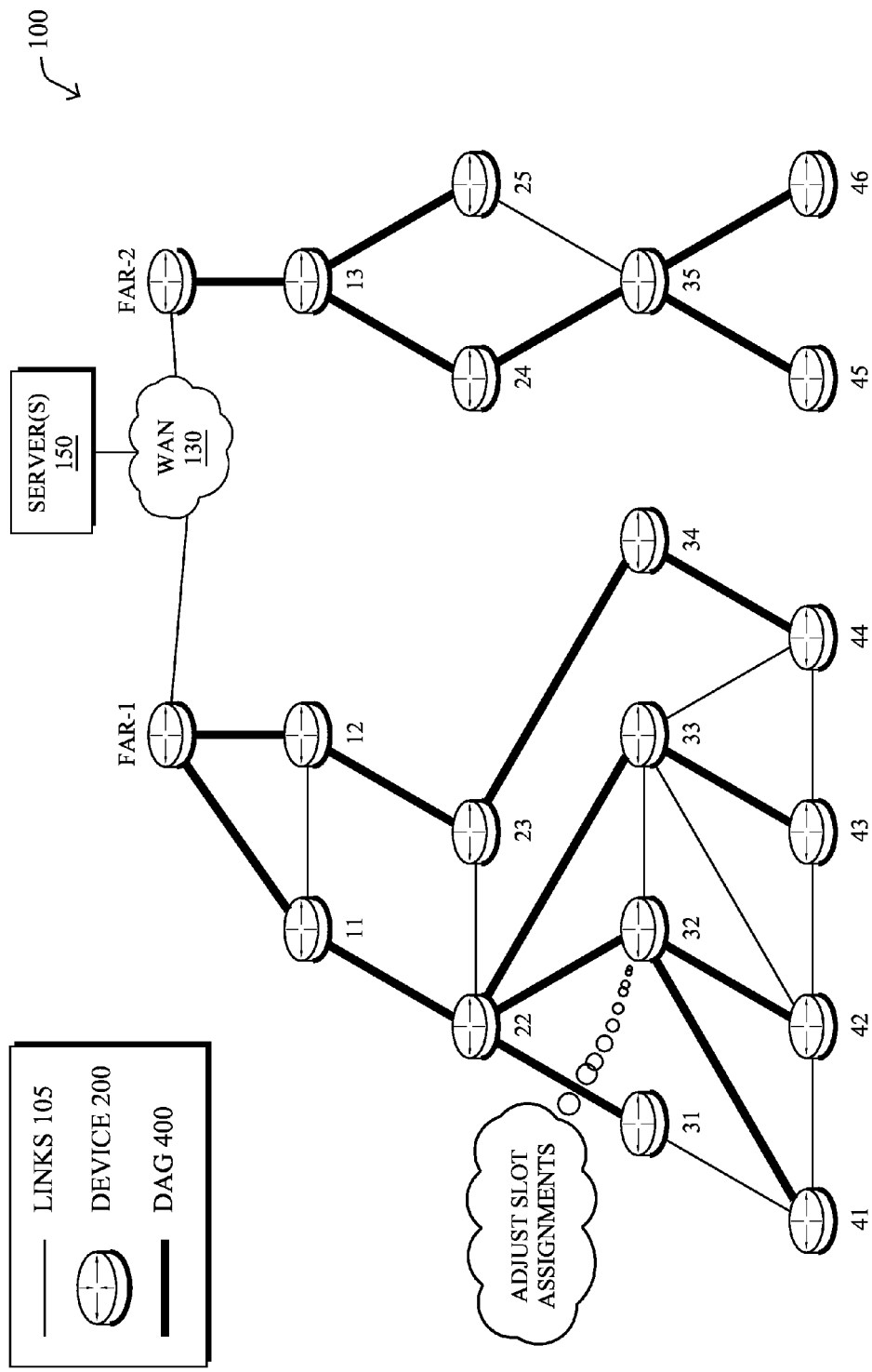
FIGS. 12A-12C illustrate examples of a parent node adjusting a communication strategy used by its child nodes.

According to various embodiments, once a parent node detects time contention (e.g., by analyzing its UTT, etc.), the parent node may then analyze the priority of the traffic. If the contention is due to excess traffic with a similar high priority, the parent node may then determine whether one of its child nodes has rerouted the excess traffic along an alternate/more expensive path. If a set of child nodes have excess high priority traffic and are penalized because they are rerouting along a significantly more expensive path, this information may be used by the parent node to free up time slots from a node that has a lower percentage of rerouted traffic, if any. In other words, the parent node may increase the number of time slots allocated to a child node that has a large percentage of rerouted traffic. For example, as shown in FIG. 12A, assume that child node 42 reroutes 30% of its traffic to alternate parent node 33 (e.g., as illustrated in FIG. 10B), thereby leading to a 40% path cost increase. Also, assume that child node 41 sends 100% of its traffic to its preferred parent node 32 (e.g., child node 41 does not reroute any of its traffic). In such a case, parent node 32 may adjust the time slot assignments for nodes 41 and 42, to increase the time slot allocations to node 42.

Figure 12B:
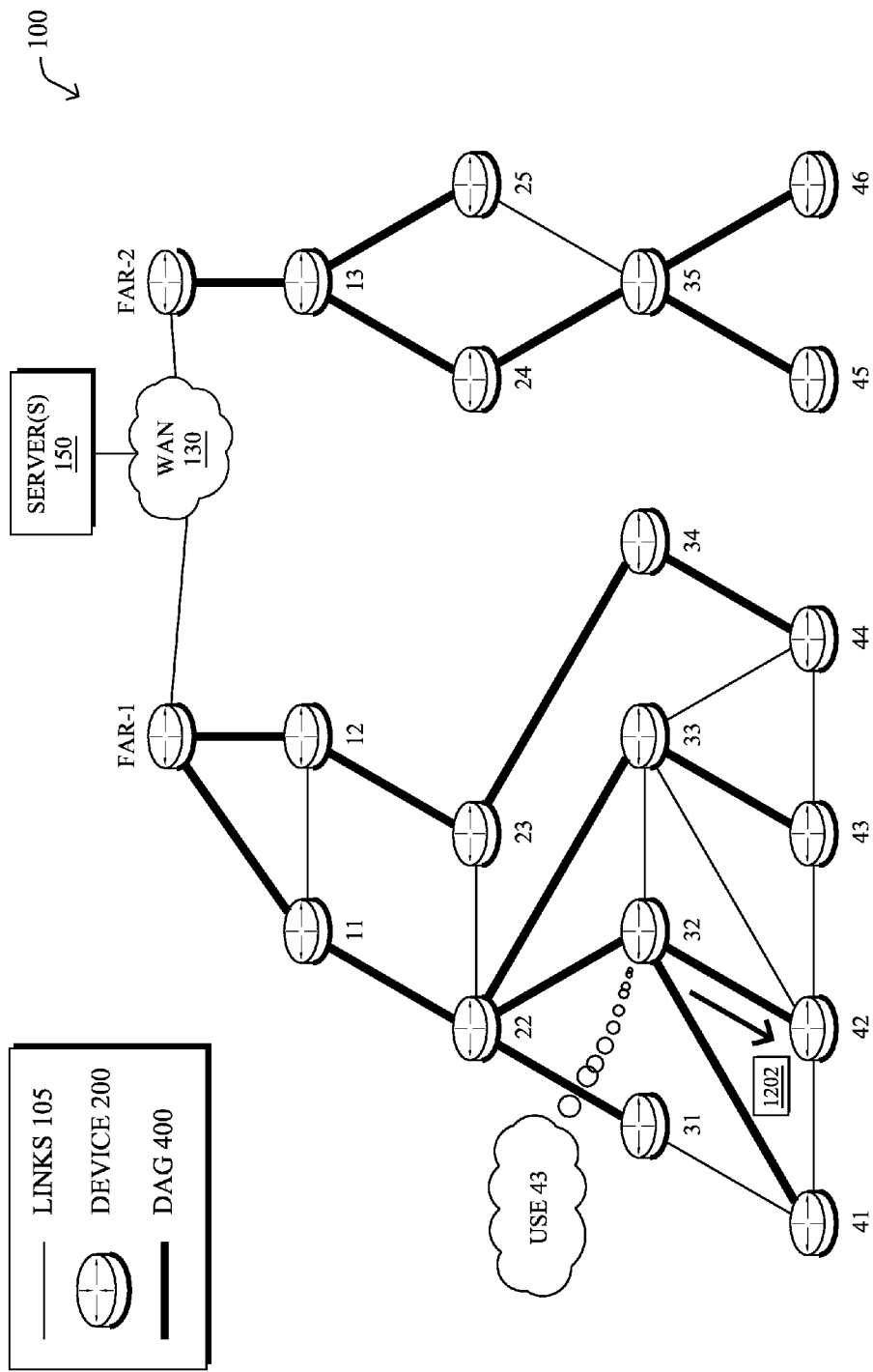
Figure 12C:
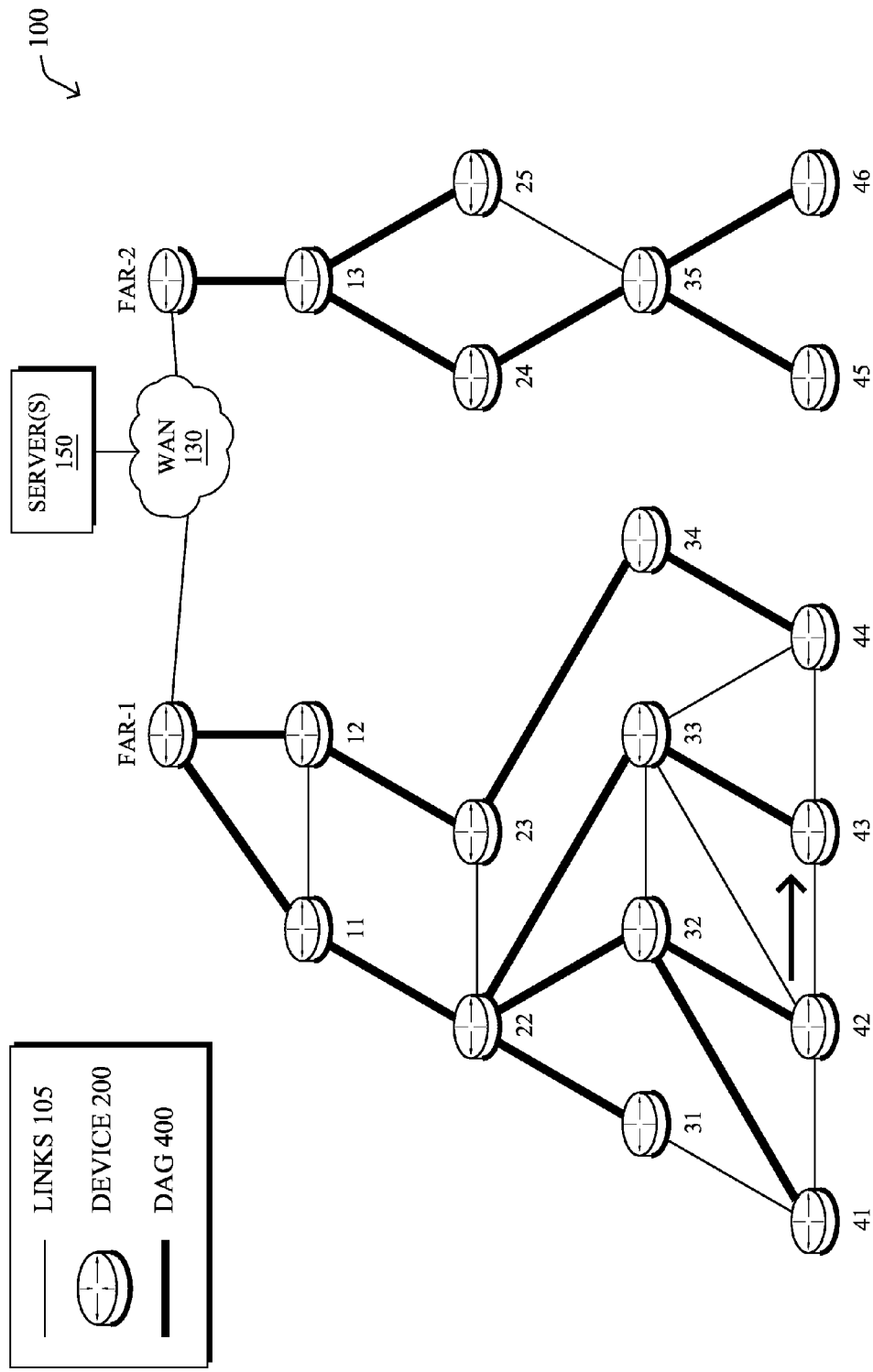

In some embodiments, a parent node may trigger a child reroute, if a time contention is detected and a local connectivity of the child node is available. In other words, if a child node reports to the preferred parent node that a large amount of high priority traffic is being rerouted along an alternate path, the parent node may analyze the connectivity information received from the child node, to determine whether a shorter path is available to the child node via one or more siblings of the child node. Known sometimes as sibling routing or horizontal routing, such a reroute is notably not supported by many routing protocols, such as RPL. For example, as shown in FIGS. 12B-12C, assume that a parent node of child node 42 (e.g., either parent node 32 or 33) receives connectivity information from child node 42, as illustrated in FIG. 11B. If the parent node determines that time contention exists for child node 42, it may send an instruction 1202 (e.g., an IPv6 message or the like) to node 42, to directly send traffic destined to node 43, thereby bypassing the preferred parent node 32 entirely. In one embodiment, instruction 1202 may be permanent (e.g., until explicitly overridden or canceled). In another embodiment, instruction 1202 may indicate a time period during which child node 42 is to communicate directly with node 43. Such a time period may be computed, for example, by the parent node according to the observed periodicity and/or period duration of the time contention.

Accordingly, the techniques herein allow a parent node to arbitrate time contention among its child nodes by performing either or both of the following operations: 1) adjusting the time schedule of its child nodes to reallocate time slots to a particular child node and 2) instructing the child node to use sibling routing to directly send traffic destined to a neighboring node. Such arbitration may be performed by taking into account the percentage of traffic rerouted by the child node along an alternate/more expensive path due to the time contention and/or other factors.

In further embodiments, the periodicity at which the time slot usage information (e.g., stored within a UTT) is refreshed by a parent may be varied according to the level of time contention. For example, when high contention is present (e.g., the contention is above a threshold level), the UTT may be refreshed more frequently. Conversely, the UTT may not even be refreshed by the parent in the absence of contention or the percentage of use time is less than a threshold amount.

Figure 13:
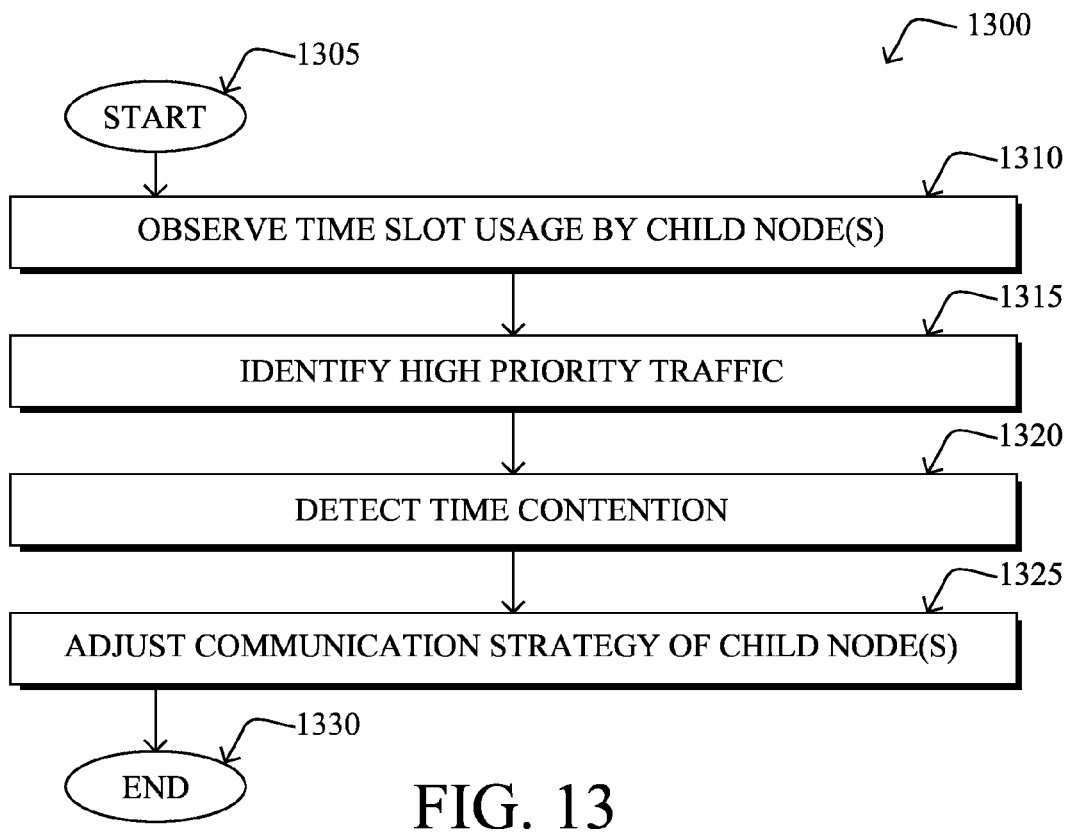
FIG. 13 illustrates an example simplified procedure for performing arbitration of time contention in a network.

FIG. 13 illustrates an example simplified procedure 1300 performing arbitration of time contention in a network, in accordance with one or more embodiments described herein. The procedure 1300 may start at step 1305, and continues to step 1310, where, as described in greater detail above, a parent node in the network may observe time slot usage by one or more of its child nodes. For example, as described above, a parent node may inspect traffic directed towards the parent by one or more of its child nodes, to determine how its child node(s) use the time slots assigned to the child node(s) by the parent node as part of a channel hopping schedule.

At step 1315, the parent node may identify high priority traffic from one or more of the child node(s), as described in greater detail above. For example, a parent node may inspect the packets sent by its child node(s), to identify the priorities of the packets. Using this information, the parent node may associate a particular time slot with the sending child node, as well as the priority of the traffic sent during the time slot. In one embodiment, the parent node may store the time slot usage and priority information within a UTT or other data structure, allowing the parent node to maintain a history of time slot usage by its child node(s). In some cases, the stored information may be compressed, reducing the storage resources required by the parent node.

At step 1320, the parent node detects time contention among its one or more child node(s), as detailed above. In general, time contention refers to the situation in which the communication needs of a child node are not satisfied by the time slots (e.g., and associated bandwidth) allocated to the node as part of a channel hopping schedule. In one embodiment, the parent node detects time contention based on the information observed and identified in steps 1310-1315. For example, the parent node may analyze its UTT, to determine whether one of its child nodes is sending a large amount of high priority traffic in the time slots allocated to the child node. In a further embodiment, the time contention may be detected based in part on traffic redirected from the child node along an alternate path (e.g., through an alternate parent node). Such information may be obtained by the parent node either directly (e.g., by receiving feedback from the child node) and/or by monitoring communications sent between the child node and the alternate parent.

At step 1325, as described in greater detail above, the parent node may adjust a communication strategy used by its one or more child nodes. In one embodiment, the parent node may adjust the channel hopping schedule used by its child nodes. For example, the parent node may increase the number of time slots allocated to a child node, if the child node is experiencing time contention. In another embodiment, as detailed above, the parent node may instruct the child node experiencing time contention to perform sibling routing. In other words, the parent node may instruct a child node to route traffic direct to a destination sibling node, even if the sibling node is not present in the topology generated by the routing protocol, and thereby bypassing the parent node. Procedure 1300 then ends at a step 1330.

Figure 14:
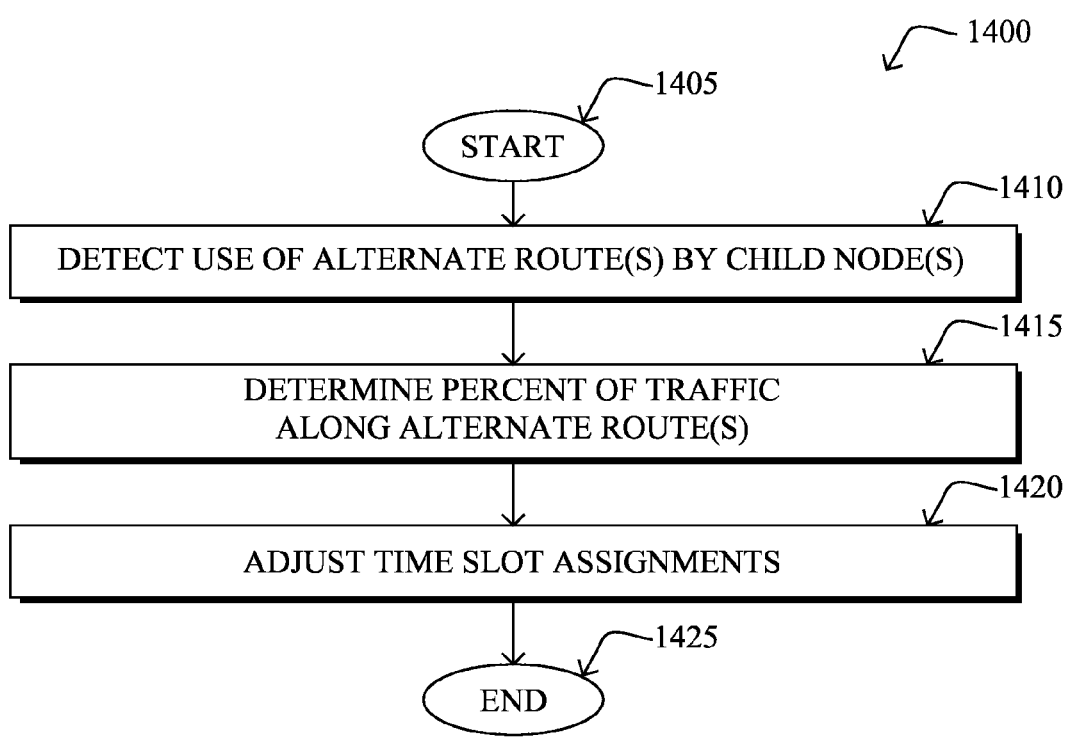
FIG. 14 illustrates an example simplified procedure for reallocating time slot assignments of child nodes.

FIG. 14 illustrates an example simplified procedure 1400 for reallocating time slot assignments of child nodes, according to various embodiments. The procedure 1400 may start at step 1405, and continues to step 1410, where, as described in greater detail above, a parent node may detect the use of alternate routes by one or more of its child nodes. In one embodiment, such detection may be based on a notification explicitly provided to the parent node by the child node. For example, the child node may include information regarding the alternate path(s), such as the percentage of traffic that the child node rerouted along the alternate path, a cost associated with the alternate path, or any other such information. In one embodiment, the notification may be provided within a routing protocol message, such as a DAO message using RPL. In further embodiments, a parent node may detect the use of an alternate path by one of its child nodes by monitoring communications associated with the child node.

At step 1415, the parent node may determine the percentage of traffic that has been rerouted by its child node along the one or more alternate paths, as described in greater detail above. In some cases, a notification received by the parent node from the child node may explicitly include such information. In other cases, such as when the parent node monitors communications associated with the child node (e.g., observed acknowledgements from the alternate parent to the child node), the parent node may determine the percentage by comparing the traffic routed through itself to the traffic routed through the alternate parent(s).

At step 1420, the parent node may adjust time slot assignments for its child node(s), as detailed above. In some implementations, the parent node may compare the amount/percentage of rerouted traffic by each of its child nodes. Based on such a comparison, the parent node may adjust the time slot allocations for its child nodes. For example, if a first child node has been rerouting a large percentage of its high priority traffic to an alternate parent and a second child node has not, the parent node may adjust the channel hopping schedule such that some of the time slots allocated to the second child node are reallocated to the first child node. Procedure 1400 then ends at step 1425.

Figure 15:
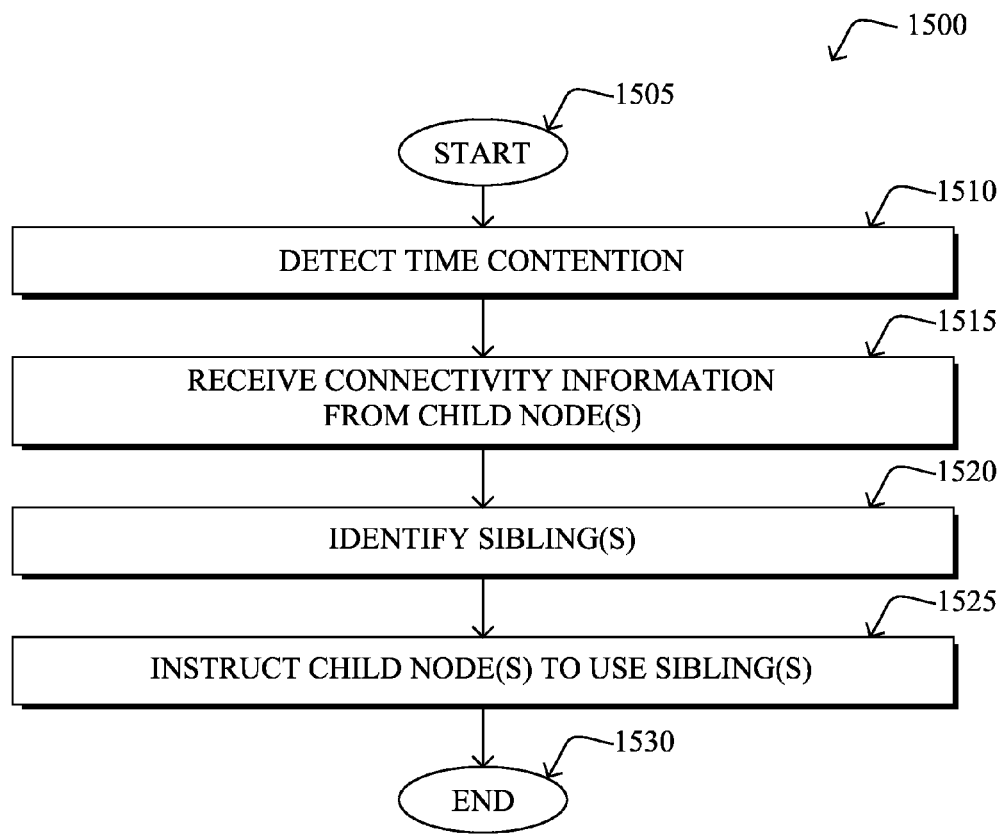
FIG. 15 illustrates an example simplified procedure for instructing a child node to route traffic to a sibling node.

FIG. 15 illustrates a simplified procedure for instructing a child node to route traffic to a sibling node, according to various embodiments. The procedure 1500 may start at step 1505, and continue on to step 1510 where, as described in greater detail above, a parent node detects time contention for one or more of its child node(s).

At step 1515, the parent node may receive connectivity information from its one or more child nodes, as described in greater detail above. For example, the parent node may request from each of its child nodes information regarding which neighboring nodes can be reached by the child node. Such information may be available, for example, by virtue of the routing protocol used or by monitoring communications from neighboring devices.

At step 1520, the parent node may identify one or more sibling nodes of its child node(s), as described in greater detail above. Based on the received connectivity information, the parent node may identify a neighboring node as a sibling of one of the child nodes of the parent. In some cases, the parent node may also determine whether any of the rerouted or delayed traffic from the child node was destined for the sibling node.

At step 1525, the parent node sends an instruction to one or more of its child node(s) to use their siblings for certain communications, as described in greater detail above. For example, the parent node may instruct one of its child nodes to send all traffic destined to one of its siblings directly to the sibling. Such a mechanism may be implemented, even if the routing protocol used does not support sibling routing. In some embodiments, the sibling routing may be performed indefinitely by the child node (e.g., until canceled or overridden). In other embodiments, the sibling routing may be performed for a specified time period. For example, the parent node may specify that sibling routing should be used for a time period based on the periodicity, etc. of the time contention. Procedure 1500 then ends at step 1530.

It should be noted that while certain steps within procedures 1300-1500 may be optional as described above, the steps shown in FIGS. 13-15 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 1300-1500 are described separately, certain steps from each procedure may be incorporated into each other procedure, and the procedures are not meant to be mutually exclusive.

The techniques described herein, therefore, provide for a lightweight arbitration mechanism that may be used to reallocate time slots between child nodes of a parent, thereby improving the "fairness" of the treatment of high priority traffic sent by different children.

While there have been shown and described illustrative embodiments that provide for the arbitration of time contention in a shared-media communication network, it is to be understood that various other adaptations and modifications may be made within the spirit and scope of the embodiments herein. For example, the embodiments have been shown and described herein primarily with respect to LLNs. However, the embodiments in their broader sense are not as limited, and may, in fact, be used with other types of networks and/or protocols (e.g., wireless). In addition, while certain protocols are shown, such as RPL, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
observing, by a parent node in a network, time slot usage of a channel hopping schedule by one or more child nodes of the parent node to communicate with the parent node;
identifying, by the parent node, high priority traffic from a particular child node;
detecting, by the parent node, time contention for the high priority traffic based on an indication that at least a portion of the traffic has been rerouted by a particular child node to a different parent node; and
adjusting, by the parent node, a communication strategy used by the one or more child nodes in response to detecting the time contention.

2. The method as in claim 1, wherein adjusting the communication strategy comprises:
increasing, by the parent node, a number of time slots in the channel hopping schedule that are allocated to the particular child node.

3. The method as in claim 1, wherein adjusting the communication strategy comprises:
determining, for each of the one or more child nodes, a percentage of traffic that is rerouted by a child node; and adjusting time slot assignments for the one or more child nodes in the channel hopping schedule based on the percentages of traffic rerouted by the one or more child nodes.

4. The method as in claim 1, wherein the indication that the traffic has been rerouted comprises observed acknowledgement messages sent from the different parent node to the one or more child nodes.

5. The method as in claim 1, wherein the indication that the traffic has been rerouted comprises one or more notifications sent by the one or more child nodes to the parent node.

6. The method as in claim 1, further comprising:
receiving connectivity data from the particular child node;
identifying one or more sibling nodes of the particular child node from the connectivity data; and
sending an instruction to the particular child node to route traffic to the one or more sibling nodes.

7. The method as in claim 6, wherein the instruction specifies a time period during which the traffic is to be routed to the one or more sibling nodes.

8. The method as in claim 1, wherein the time contention is detected based in part on a determination that the particular child node experienced a queuing delay.

9. The method as in claim 1, further comprising:
receiving feedback information from the particular child node regarding traffic sent from the child node to a node that differs from the parent node; and
forwarding the feedback information to a predictive time schedule path computation element (PCE) device.

10. An apparatus, comprising:
one or more network interfaces to communicate with a shared-media communication network;
a processor coupled to the network interfaces and configured to execute one or more processes; and
a memory configured to store a process executable by the processor, the process when executed operable to:
observe time slot usage of a channel hopping schedule by one or more child nodes of the apparatus to communicate with the apparatus;
identify high priority traffic from a particular child node;
detect time contention for the high priority traffic based on an indication that at least a portion of the traffic has been rerouted by a particular child node to a different parent node; and
adjust a communication strategy used by the one or more child nodes in response to detecting the time contention.

11. The apparatus as in claim 10, wherein the communication strategy is adjusted by:
increasing a number of time slots in the channel hopping schedule that are allocated to the particular child node.

12. The apparatus as in claim 10, wherein the process when executed is further operable to:
receive data indicative of traffic being rerouted by the one or more child nodes to a different parent node;
determine, for each of the one or more child nodes, a percentage of traffic that is rerouted by a child node; and
adjust time slot assignments for the one or more child nodes in the channel hopping schedule based on the percentages of traffic rerouted by the one or more child nodes.

13. The apparatus as in claim 10, wherein the indication that the traffic has been rerouted comprises observed acknowledgement messages sent from the different parent node to the one or more child nodes.

14. The apparatus as in claim 10, wherein the indication that the traffic has been rerouted comprises one or more notifications sent by the one or more child nodes to the parent node.

15. The apparatus as in claim 10, wherein the process when executed is further operable to:
receive connectivity data from the particular child node;
identify one or more sibling nodes of the particular child node from the connectivity data; and
send an instruction to the particular child node to route traffic to the one or more sibling nodes.

16. The apparatus as in claim 15, wherein the instruction specifies a time period during which the traffic is to be routed to the one or more sibling nodes.

17. The apparatus as in claim 16, wherein the time period is based on a detected periodicity of the time contention.

18. The apparatus as in claim 10, wherein the process when executed is further operable to:
receive feedback information from the particular child node regarding traffic sent from the child node to a node that differs from the apparatus; and
forward the feedback information to a predictive time schedule path computation element (PCE) device.

19. A tangible, non-transitory, computer-readable media having software encoded thereon, the software when executed by a processor operable to:
observe time slot usage of a channel hopping schedule by one or more child nodes of the apparatus to communicate with a parent node;
identify high priority traffic from a particular child node;
detect time contention for the high priority traffic based on an indication that at least a portion of the traffic has been rerouted by a particular child node to a different parent node; and,
adjust a communication strategy used by the one or more child nodes in response to detecting the time contention.

20. The computer-readable media as in claim 19, wherein the software when executed is further operable to:
increase a number of time slots in the channel hopping schedule that are allocated to the particular child node.

* * * * *